United States Patent
Schneider et al.

(10) Patent No.: US 9,247,328 B2
(45) Date of Patent: Jan. 26, 2016

(54) SYSTEMS AND METHODS FOR MOVING DSL LAUNCH POINTS

(75) Inventors: Kevin W. Schneider, Huntsville, AL (US); Arlynn Wayne Wilson, Huntsville, AL (US)

(73) Assignee: ADTRAN, Inc., Huntsville, AL (US)

(*) Notice: Subject to any disclaimer, the term of this patent is extended or adjusted under 35 U.S.C. 154(b) by 669 days.

(21) Appl. No.: 13/434,808

(22) Filed: Mar. 29, 2012

(65) Prior Publication Data

US 2012/0250492 A1    Oct. 4, 2012

Related U.S. Application Data

(60) Provisional application No. 61/468,603, filed on Mar. 29, 2011, provisional application No. 61/468,808, filed on Mar. 29, 2011.

(51) Int. Cl.
*H04Q 11/04* (2006.01)
*H04M 11/06* (2006.01)

(52) U.S. Cl.
CPC ............ *H04Q 11/04* (2013.01); *H04M 11/062* (2013.01); *H04Q 2213/13003* (2013.01); *H04Q 2213/13039* (2013.01); *H04Q 2213/13298* (2013.01)

(58) Field of Classification Search
None
See application file for complete search history.

(56) References Cited

U.S. PATENT DOCUMENTS

| | | | |
|---|---|---|---|
| 2002/0031113 A1* | 3/2002 | Dodds et al. | 370/352 |
| 2002/0161542 A1 | 10/2002 | Jones et al. | |
| 2004/0095956 A1* | 5/2004 | Henderson et al. | 370/463 |
| 2006/0210054 A1* | 9/2006 | Stiscia | 379/399.01 |
| 2007/0104227 A1 | 5/2007 | Rivera | |
| 2008/0002669 A1 | 1/2008 | O'Brien et al. | |
| 2008/0144484 A1 | 6/2008 | Sourani | |
| 2008/0151929 A1* | 6/2008 | Uhlemann | 370/463 |

FOREIGN PATENT DOCUMENTS

EP      1565031      2/2008

* cited by examiner

*Primary Examiner* — Hicham Foud
(74) *Attorney, Agent, or Firm* — Maynard Cooper & Gale, P.C.; Jon E. Holland

(57) ABSTRACT

A system for scaling vectored DSLAM deployments has a DSLAM interfaced with a cross-connect apparatus. The DSLAM receives POTS signals from at least one bridge connection assembly. When a DSLAM is added at the cross-connect facility, at least one connector of the bridge connection assembly is disconnected from an existing DSLAM and is interfaced with the newly-added DSLAM. By moving the connector to the newly-added DSLAM, a batch of downstream distribution pairs (which are preferably bound by a single distribution cable) are effectively moved from the existing DSLAM to the new DSLAM without having to reconfigure the jumpers of the cross-connect apparatus. Accordingly, it is possible to scale the cross-connect facility to any number of vectored DSLAMs while limiting vector group sizes, thereby reducing the complexity of vectoring operations, without having to perform complex reconfigurations of the cross-connect apparatus.

18 Claims, 17 Drawing Sheets

SYSTEMS AND METHODS FOR MOVING DSL LAUNCH POINTS

CROSS REFERENCE TO RELATED APPLICATIONS

This application claims priority to U.S. Provisional Patent Application No. 61/468,603, entitled "Scaling a Vectored DSLAM deployment" and filed on Mar. 29, 2011, which is incorporated herein by reference. This application also claims priority to U.S. Provisional Patent Application No. 61/468,808, entitled "Communications System having Shortened Loops and Moved DSL Launch Points" and filed on Mar. 29, 2011, which is incorporated herein by reference.

RELATED ART

Vectored digital subscriber line (DSL) cancels the upstream or downstream crosstalk by coordinating signals at the central office or line terminal and increases the data rates over more common Dynamic Spectrum Management (DSM) methods. The term vector is used because the DSL's individual physical layer of voltages is viewed as a coordinated set or vector of voltages. This group or vector is processed by a digital signal processor for downstream transmission and also upstream reception. The processor performs pre-processing of transmitted signals in a downstream transmission such as by pre-coding or linear pre-filtering and joint processing of the received signals in the upstream using received filtering and successive cancellation. The group processing allows cancellation or removal of crosstalk. Typically, the gain from vectoring is largest when all lines in a "binder" or cable group are processed simultaneously.

In order to get the loops short enough to enable desired bit rates, digital subscriber line access multiplexers (DSLAMs) are often deployed at cross-connect facilities. To obtain a maximum vectoring performance, it is typically necessary to have the vector group include all DSL pairs in a cable. Typical cross-connect facilities have multiple distribution cables and if there is one vector group/DSLAM for the entire cross-connect facility, it is possible to ensure that all DSL pairs in a cable are part of the same vector group, but at a cost of considerable complexity. The vector processing for the first DSLAM must scale up to the ultimate port count envisioned for full deployment.

Alternatively, it is possible to partition the cross-connect facilities so that one vector group/DSLAM is assigned to each cable route or a subset of cable routes. This reduces the maximum vector group size that must be accommodated. This solution, however, requires a DSLAM for each partition at the first day of deployment.

More generally, the complexity of a vectored DSLAM grows with the square of the number of pairs in the vector group. Therefore, it is desirable to keep the size of the vector group small. When deploying a vectored DSLAM at a junction of cables, one way to limit the size of the vector group is to deploy one vector group for every "downstream" cable that emerges from the junction. This limits the maximum size of the vector group to the maximum number of DSL working pairs in the cable, which in many instances is a fraction of the total number of pairs emanating from the junction.

The downside to this approach is that more DSLAM ports are needed, since a supply of available ports must be allocated to each cable/vectoring group. This is especially expensive when planning for future growth. While the total number of ports today may fit in one vectoring group, the projection for growth in port counts due to future increased service take rates and bonding of multiple pairs to a single subscriber would size the DSLAM port capacity such that the subdivision of DSLAM ports by cable is necessary to limit the vector group size.

If a service provider chooses to "start small" and use a single DSLAM until it reaches its vectored port capacity, it would take a rather expensive and error prone jumper reconfiguration to move the existing subscribers to the correct DSLAM when the additional DSLAM is added. In this example, what is needed is a method that allows a service provider to "start small" and be able to grow to multiple vectored DSLAMs without an expensive reconfiguration process.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for scaling vectored digital subscriber line access multiplexer (DSLAM) deployments. In one exemplary embodiment, a vectored DSLAM is coupled to a cross-connect apparatus (e.g., a crossbox) at a cross-connect facility and a network data line, such as an optical fiber from a network facility (e.g., central office), and the network data line provides data to be communicated to equipment at one or more customer premises. Connections, referred to herein as "POTS pairs," from the cross-connect apparatus provide plain old telephone system (POTS) signals to the DSLAM, and the DSLAM forms DSL signals, such as very-high-speed digital subscriber line, second generation (VDSL2) signals, based on data from the network data connection which are added to the lines using frequency band splitters. Such POTS and DSL signals are transmitted from the DSLAM to the cross-connect apparatus, which interfaces the POTS and DSL signals with distribution pairs for carrying these signals to customer premises equipment (CPE).

In one exemplary embodiment, a plurality of POTS pairs feed POTS to the DSLAM from the cross-connect apparatus via a bridge connection assembly. When a DSLAM is added at the cross-connect facility, at least one connector of the bridge connection assembly is disconnected from an existing DSLAM and is interfaced with the newly-added DSLAM. By moving the connector to the newly-added DSLAM, a batch of downstream distribution pairs (which are preferably bound by a single distribution cable) are effectively moved from the existing DSLAM to the new DSLAM without having to reconfigure the jumpers of the cross-connect apparatus. Accordingly, it is possible to scale the cross-connect facility to multiple vectored DSLAMs while limiting vector group sizes, thereby reducing the complexity of vectoring operations without having to perform complex reconfigurations of the cross-connect apparatus.

Figure 1:
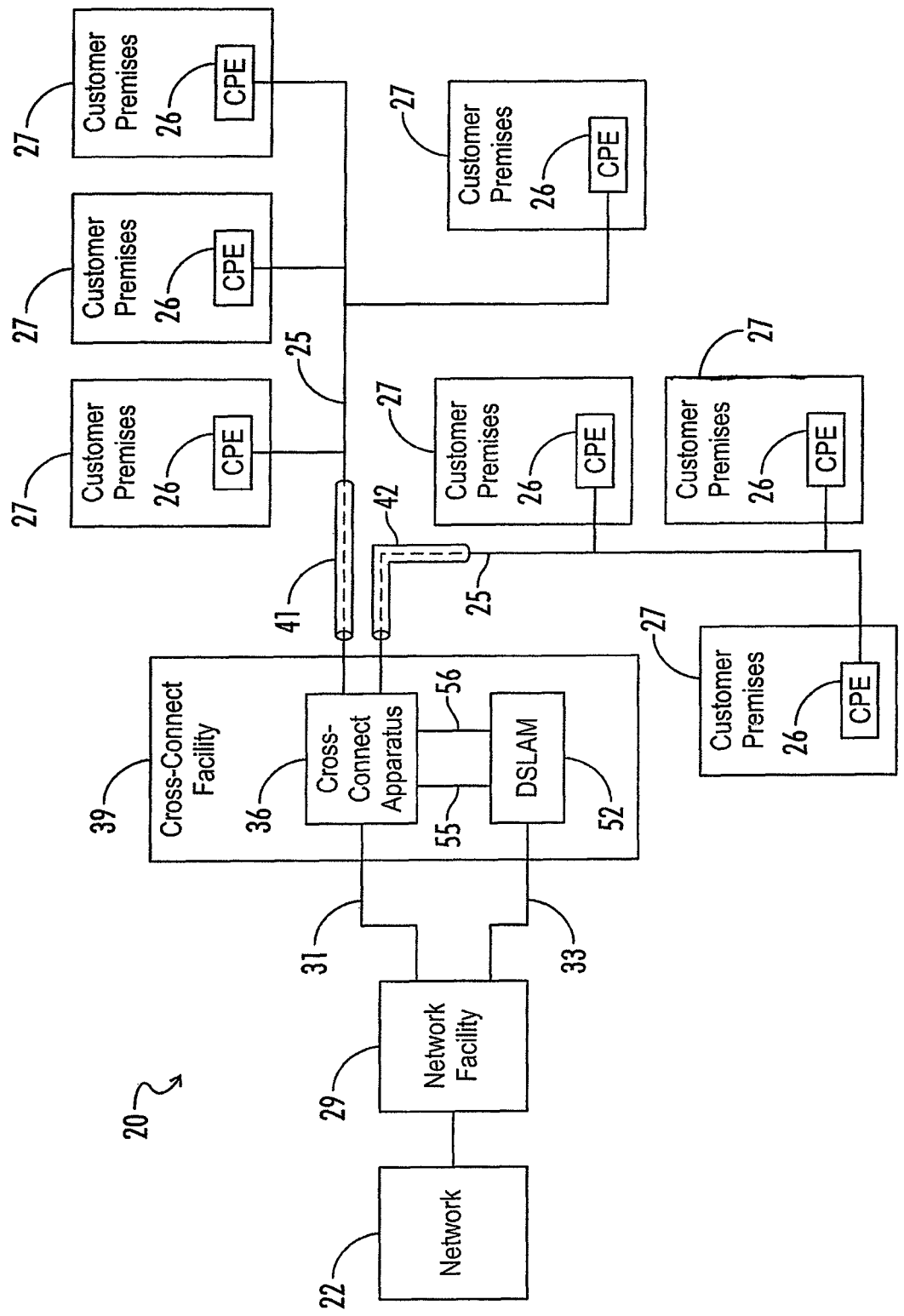
FIG. 1 is a block diagram illustrating an exemplary embodiment of a communication system.

FIG. 1 depicts an exemplary embodiment of a communication system 20 for communicating between a network 22 and customer premises equipment (CPE) 26 at a plurality of customer premises 27. In the downstream direction, a network facility 29 (e.g., a central office) transmits plain old telephone system (POTS) signals across a plurality of conductive connections 31. In one exemplary embodiment, each connection 31 comprises a twisted-wire pair, referred to hereafter as "feeder pair," but other types of connections may be employed in other embodiments. In addition, the network facility 29 also transmits data signals defining a high-speed data stream across at least connection 33, referred to hereafter as "network data line." In one embodiment, such data signals are optical, and the network data line 33 comprises at least one optical fiber. However, other types of data signals and connections are possible in other embodiments.

As shown by FIG. 1, the feeder pairs 31 are coupled to terminals (not shown in FIG. 1) of a cross-connect apparatus 36 at a cross-connect facility 39, and such terminals of the cross-connect apparatus 36 are coupled to a plurality of downstream conductive connections 25, which are also coupled to CPE 26 at a plurality of customer premises 27, as shown by FIG. 1. In one exemplary embodiment, each connection 25, also referred to as a "conductor," comprises a twisted-wire pair, referred to hereafter as "distribution pair," but other types of connections may be employed in other embodiments.

In addition, a plurality of cables 41, 42, referred to herein as "distribution cables," are used to bind sets of the distribution pairs 25. For example, as shown by FIG. 1, a plurality of distribution pairs 25 are bound by a distribution cable 41 for at least a portion of the distance from the cross-connect facility 39 to the customer premises 27 serviced by such distribution pairs 25, and another plurality of distribution pairs 25 are bound by a distribution cable 42 for at least a portion of the distance from the cross-connect facility 39 to the customer premises 27 serviced by such distribution pairs 25. For simplicity of illustration, FIG. 1 shows only two distribution cables 41, 42, but there may be any number of distribution cables in other embodiments.

As shown by FIG. 1, the network data line 33 is coupled to a network device 52 at the cross-connect facility 39. As will be described in more detail hereafter, network device 52 is configured to receive data from the network facility 29 and to inject such data into paths of the signals propagating across the feeder pairs 31. In one exemplary embodiment, the network device 52 is a digital subscriber line access multiplexer (DSLAM) 52. For illustrative purposes, it will be assumed hereafter that the network device 52 is a DSLAM, but it should be emphasized that other types of devices are possible in other embodiments.

Figure 2:
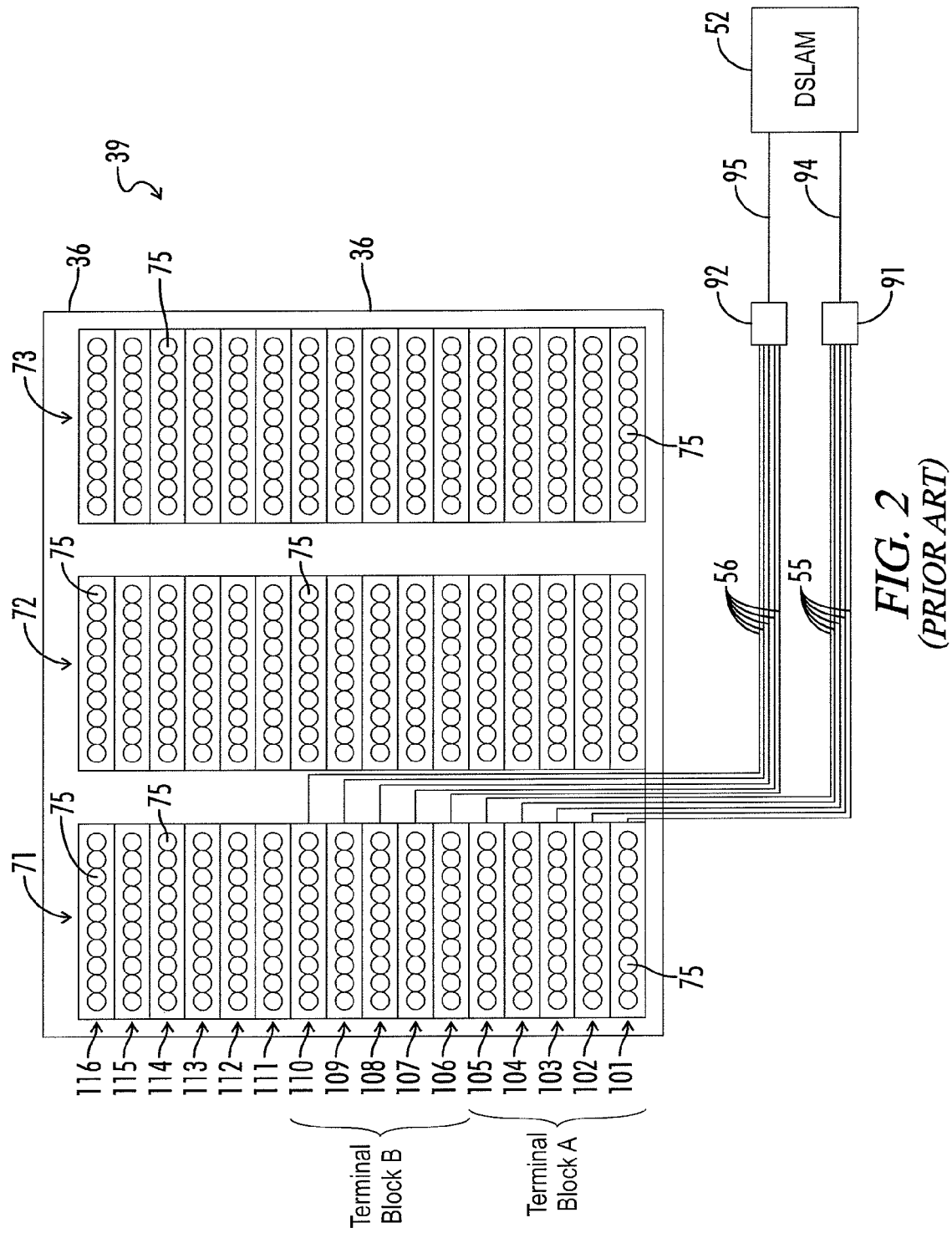
FIG. 2 is a block diagram illustrating a cross-connect facility with a conventional cross-connect apparatus, such as is depicted by FIG. 1.

Such DSLAM 52 is coupled to the cross-connect apparatus 36 via a plurality of conductive connections 55, 56, as shown by FIG. 2. In one exemplary embodiment, each connection 55 comprises a twisted-wire pair, referred to hereafter as "POTS pair," for carrying POTS signals communicated across a respective feeder pair 31, and each connection 56 comprises twisted-wire pair, referred to hereafter as "DSL pair," for carrying POTS and DSL signals communicated by the DSLAM 52. Note that there is not a one-to-one correspondence between the POTS pairs 55, 56 and the lines representing them in drawings. As an example, for simplicity of illustration, each row 101-110 of FIG. 2 is shown as connected to a single line 55 or 56, but each line 55, 56 actually represents multiple pairs. Indeed, each terminal 75 of Terminal Block A is coupled to a respective POTS pair 55, and each terminal of Terminal Block B is coupled to a respective DSL pair 56. Thus, in the exemplary embodiment of FIG. 2, ten POTS pairs 55 (a pair 55 for each terminal 75) extend from each row 101-105, and ten DSL pairs 56 (a pair for each terminal 75) extend from each row 106-110). In other embodiments, other types of connections are possible.

The DSLAM 52 is configured to form DSL signals (e.g., VDSL2 or other flavors of DSL), based on data from the network data line 33. As an example, for each CPE 27 that is to receive data from the network data line 33, the DSLAM 52 is configured to modulate at least one carrier signal with data from the network data line 33, thereby forming a modulated data signal, according to the applicable DSL protocol. This modulated data signal, also referred to herein as a "DSL signal," propagates across a respective DSL pair 56 of the DSLAM cable 58 along with any POTS signal to be transmitted across the same distribution pair 25 as the DSL signal.

The cross-connect apparatus 36 connects such DSL pair 56 to the appropriate distribution pair 25 for carrying the DSL signal and the POTS signal to the destination CPE 27. Note that the POTS signal and DSL signal are separated in frequency such that these signals are prevented from interfering with each other despite simultaneously propagating across the same DSL pair 56 and distribution pair 25.

The DSLAM 52 is preferably configured to perform vectoring operations in order to compensate for crosstalk from its DSL signals affecting the other DSL signals communicated by it. (This is known as self-crosstalk.) In performing vectoring operations, the DSLAM 52 generally estimates an amount of interference induced by an interfering tone that is affecting or will affect a victim tone. The DSLAM 52 also combines the estimate with the victim tone in an effort to cancel the interference from the victim tone or pre-distorts the victim tone so that crosstalk is cancelled during transmission. Such techniques can be performed tone-by-tone such that each tone for a given vector group can be compensated for the effects of the other tones within the same vector group. Exemplary techniques for performing vectoring are described in commonly-assigned U.S. patent application Ser. No. 13/016,680, entitled "Systems and Methods for Cancelling Crosstalk in Satellite Access Devices" and filed on Jan. 28, 2011, which is incorporated herein by reference. Unfortunately, as noted previously, vectoring is computationally expensive, and the complexity of the vectoring operations generally grows by N squared as the size of the vector group increases.

In the upstream direction, the aforementioned communication is reversed. That is, for a given CPE 27 communicating both POTS and DSL, a modulated data signal in accordance with applicable DSL protocol and a POTS signal are both carried by a respective distribution pair 25 and a respective DSL pair 56 to the DSLAM 52. The DSLAM 52 demodulates the data signal to recover data, which is multiplexed with data from other CPEs 27 to form a high-speed data stream for transmission across the network data line 33 to the network facility 29. The POTS signal is carried by a respective POTS pair 55, which is connected to a respective feeder pair 31 by the cross-connect apparatus 36, as described above. Such feeder pair 31 carries the POTS signal to the network facility 29.

FIG. 2 depicts a conventional arrangement for the cross-connect apparatus 36 and DSLAM 52. In this regard, the cross-connect apparatus 36 has three bays 71-73 of wiring terminals 75. In the embodiment depicted by FIG. 2, each bay 71-73 has sixteen rows of wiring terminals 75 with ten wiring terminals 75 in each row. For example, bay 71 has sixteen rows 101-116 of wiring terminals 75 thereby providing one-hundred sixty (160) wiring terminals 75.

Each wiring terminal 75 is connected to a respective feeder pair 31 or distribution pair 25 via a pair of wires (usually twisted) that are connected to the backside of the cross-connect apparatus 36 (hidden from view in FIG. 2). Each feeder pair 31 and distribution pair 25 is electrically connected to a single respective wiring terminal 75. Thus, by connecting a jumper (comprising a pair of wires—usually twisted) between a terminal 75 connected to a feeder pair 31 and a second terminal 75 connected to a distribution pair 25, an electrical connection is made between the feeder and distribution pairs.

For simplicity and convenience reasons, the distribution pairs 25 of the same distribution cable 41, 42 are often connected to contiguous wiring terminals 75 of the same bay 71-73. As an example, assume that the distribution cable 41 comprises fifty distribution pairs 25. Such distribution pairs 25 may be coupled on the backside of the cross-connect apparatus 36 to the wiring terminals 75 in rows 112-116 of the bay 71. For illustrative purposes, it will be assumed hereafter unless otherwise stated that (1) the distribution pairs 25 of the cable 41 extending to one or more customer premises 27 are connected to wiring terminals 75 in rows 112-116 of the bay 71 on the backside of the cross-connect apparatus 36, (2) the distribution pairs 25 of the cable 42 extending to other customer premises 27 are connected to wiring terminals 75 of the bay 73 on the backside of the cross-connect apparatus 36, and (3) the feeder pairs 31 are connected to wiring terminals 75 of the bay 72 on the backside of the cross-connect apparatus 36. In other embodiments, other configurations of the cross-connect apparatus 36 are possible.

This cross-connect apparatus 36 can also be used to insert a DSL signal into the distribution pair—also termed connecting a DSL-port to the customer twisted pair. The location at which DSL signals are inserted into a distribution pair carrying POTS signals is generally referred to as a "DSL launch point." To implement a DSL launch point, the cross-connect apparatus 36 is arranged to provide POTS signals to the DSLAM, which inserts DSL signals into the communication paths of the POTS signals. In such an embodiment, each of the POTS pairs 55 and DSL pairs 56 of a DSLAM 52 are electrically connected to terminal blocks and then jumpers are run between these blocks and the terminal blocks where the feeder and distribution pairs are connected, respectively. The POTS pairs 55 feed POTS signals to the DSLAM, and the DSL pairs 56 carries POTS and DSL signals from the DSLAM to the cross-connect apparatus 36, which electrically connects the DSL pairs 56 to distribution pairs 25 for carrying the POTS and DSL signals to CPE 26. Note that, as described above, there is not a one-to-one correspondence between lines drawn in the drawings and those that follow (with the exception of FIG. 5) for POTS pairs 55 and DSL pairs 56; each line 55, 56 represents multiple pairs, except for FIG. 5 where each line 55, 56 represents a single pair.

Assume for illustrative purposes that the DSLAM 52 is capable of servicing up to forty-eight distribution pairs 25. In such an embodiment, there are preferably at least forty-eight POTS pairs 55 respectively coupled to forty-eight wiring terminals 75 of the cross-connect apparatus 36, and similarly there are at least forty-eight DSL pairs 56 respectively coupled to forty eight wiring terminals 75 of the cross-connect apparatus 36. For illustrative purposes, assume that the POTS pairs 55 are coupled to contiguous wiring terminals 75 of rows 101-105 of bay 71 (referred to hereafter as "Terminal Block A") and that the DSL pairs 56 are coupled to contiguous wiring terminals 75 of rows 106-110 of bay 71 (referred to hereafter as "Terminal Block B").

As shown by FIG. 2, connectors 91, 92 (typically part of a connectorized splicing system, such as a 3M 710 Splicing System) are often used to connect the pairs 55, 56, respectively, to the DSLAM 52. These connectors make it more convenient to associate a given block or range of terminals with the facility it is connected to: feeder pairs, distribution pairs, DSLAM POTS-pairs or DSLAM DSL-pairs. In this regard, a pair of cables 94, 95, referred to hereafter as DSLAM cables 94, 95, extends from the DSLAM 52, and each cable 94, 95 comprises a plurality of conductive connections (e.g., twisted-wire pairs). The connectors 91, 92 respectively connect the pairs of the cables 94, 95 to the POTS and DSL pairs 55, 56 which are, in turn, connected to the terminals 75. For each port of the DSLAM 52, a POTS side of the port is electrically connected through a respective pair of the cable 94, connector 91, and a respective POTS pair 55 to a respective terminal 75 of Terminal Block A, and a DSL side of the same port is electrically connected through the a respective pair of the cable 95, connector 92, and a respective DSL pair 56 to a respective terminal 75 of Terminal Block B.

Figure 3:
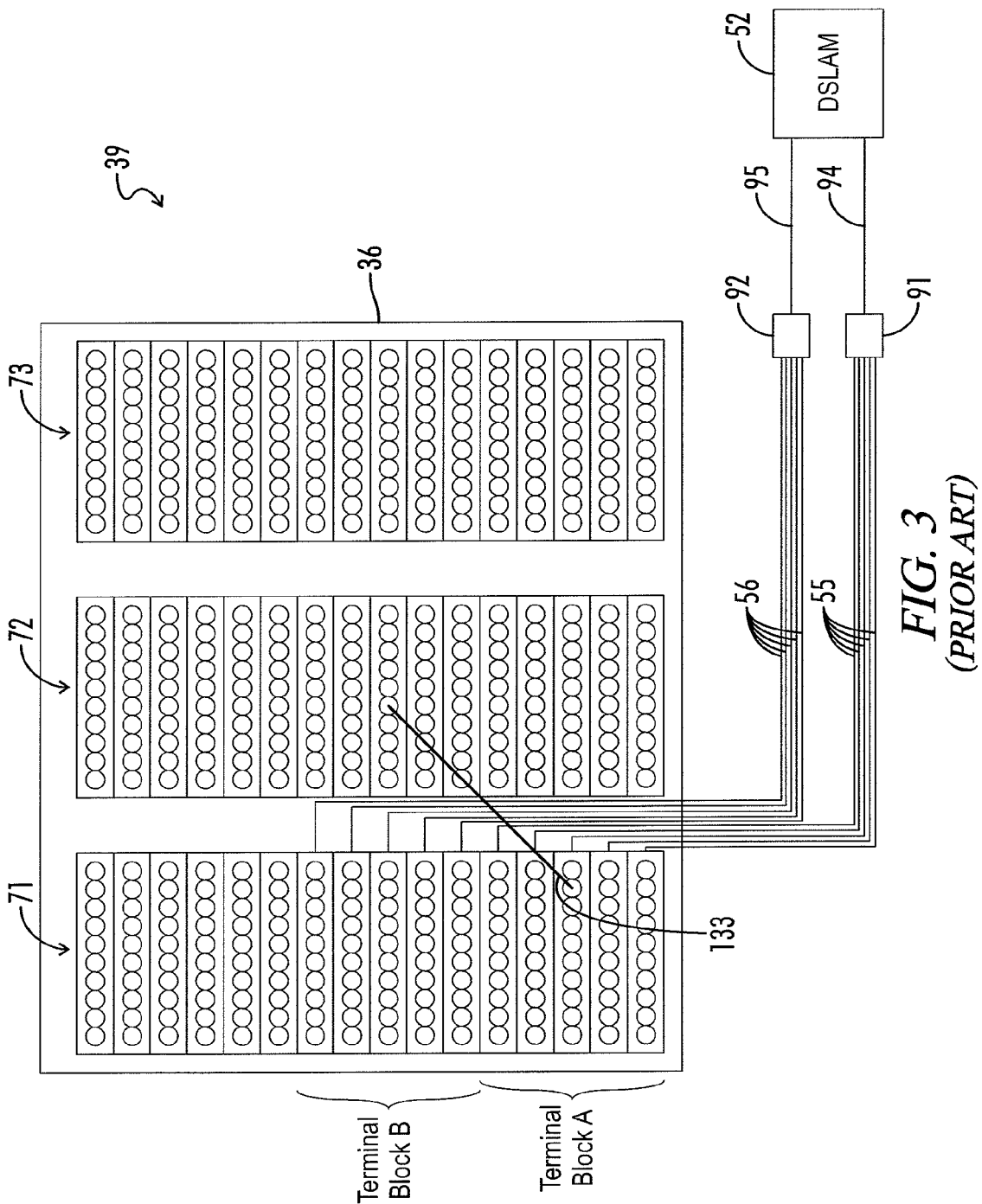
FIG. 3 is a block diagram illustrating a conventional jumper arrangement for the cross-connect apparatus depicted by FIG. 2.

Moreover, the cross-connect apparatus 36 provides a convenient means for cross-connecting distribution pairs 25 and feeder pairs 31 to the DSLAM 52 and/or other equipment. In this regard, as shown by FIG. 3, a connection 133 (referred to herein as a "jumper") may be used to cross-connect any terminal 75 with any other terminal 75. Each jumper 133 comprises a pair of wires (e.g., a twisted-wire pair) and has an interface (not specifically shown in FIG. 3) at each end for mating such end with a terminal 75. When an end of the jumper 133 is so mated with a terminal 75, one wire of the jumper 133 is electrically connected to one of the wires of the distribution pair 25 or feeder pair 31, if any, that is also connected to the terminal 75 on the backside of the cross-connect apparatus 36, and the other wire of the jumper 133 is electrically connected to the other wire of such distribution pair 25 or feeder pair 31. Thus, a given jumper 133 effectively "jumps" from one terminal 75 to another terminal 75 electrically coupling the two terminals 75 together. Notably, both terminals 75 connected to the same jumper 133 are also electrically connected to the distribution pair 25 and/or feeder pair 31 connected (usually via the backside of the cross-connect apparatus 36) to either of the terminals 75.

Using jumpers, paths from the network facility 29 through the DSLAM 52 to the CPE 26 of various customer premises 27 can be defined. As an example, assume that one of the feeder pairs 31 from the network facility 29 is to carry POTS signals for CPE 26 that is coupled to one of the distribution pairs 25 bound by the cable 41. As described above, such feeder pair 31 from the network facility 29 is connected to a terminal 75 of the bay 72 via a pair of wires connected to the backside of the cross-connect apparatus 36. Assume that such terminal 75 is connected to a terminal 75 of Terminal Block A in the bay 71 by the jumper 133 shown by FIG. 3. Further assume that the terminal 75 of the bay 71 connected to such jumper 133 is electrically coupled to a POTS pair 55 via a pair of wires connected to the backside of the cross-connect apparatus 36.

In the instant example, a POTS signal propagating across the feeder pair 31 travels across the jumper 133 to the POTS pair 55, which provides the POTS signal to a POTS side of a port of the DSLAM 52. The DSLAM 52 may also receive data destined for the same CPE 26 from the network data line 33. In such case, the DSLAM 52 is configured to form a DSL signal based on such data and to send both the DSL signal and the POTS signal (which are both destined for the same customer premises 27) to a DSL side of the foregoing port. A DSL pair 56 coupled to such DSLAM port carries both the POTS signal and the DSL signal to a terminal 75 of Terminal Block B. To provide a path to the CPE 26 that is to receive the POTS signal and the DSL signal, such terminal 75 of Terminal Block B is preferably coupled via a jumper 135 (FIG. 4) to a terminal 75 of bay 71 that is electrically coupled via a pair of wires connected to the backside of the cross-connect apparatus 36 to the distribution pair 25 that extends to such CPE 26. In such case, the POTS signal and the DSL signal travel from the DSLAM 52 through the jumper 135 to the distribution pair 25 of the cable 41 that is to carry such signals to the destination CPE 26.

To facilitate the wiring of the jumpers 133, 135, a terminal 75 of Terminal Block A and a terminal 75 of Terminal Block B coupled to the same port of the DSLAM 52 have corresponding locations in Terminal Blocks A and B respectively. As an example, in FIG. 5, the penultimate terminal 75 of the third row (i.e., row 103) in Terminal Block A and the penultimate terminal 75 of the third row (i.e., row 108) in Terminal B are both coupled to the same port, as further shown by FIG. 5, such that the POTS signals from a given feeder pair 31 pass through both terminals 75. Accordingly, by examining the jumper pattern of bay 71, it can be determined whether both sides of a given DSLAM port are appropriately coupled to jumpers 133, 135, respectively. (While this physical correspondence may reduce wiring errors, it is not required, as the pair assignments are typically labeled on the connectors. It is provided as exemplary to help illustrate the concepts described herein.)

Figure 5:
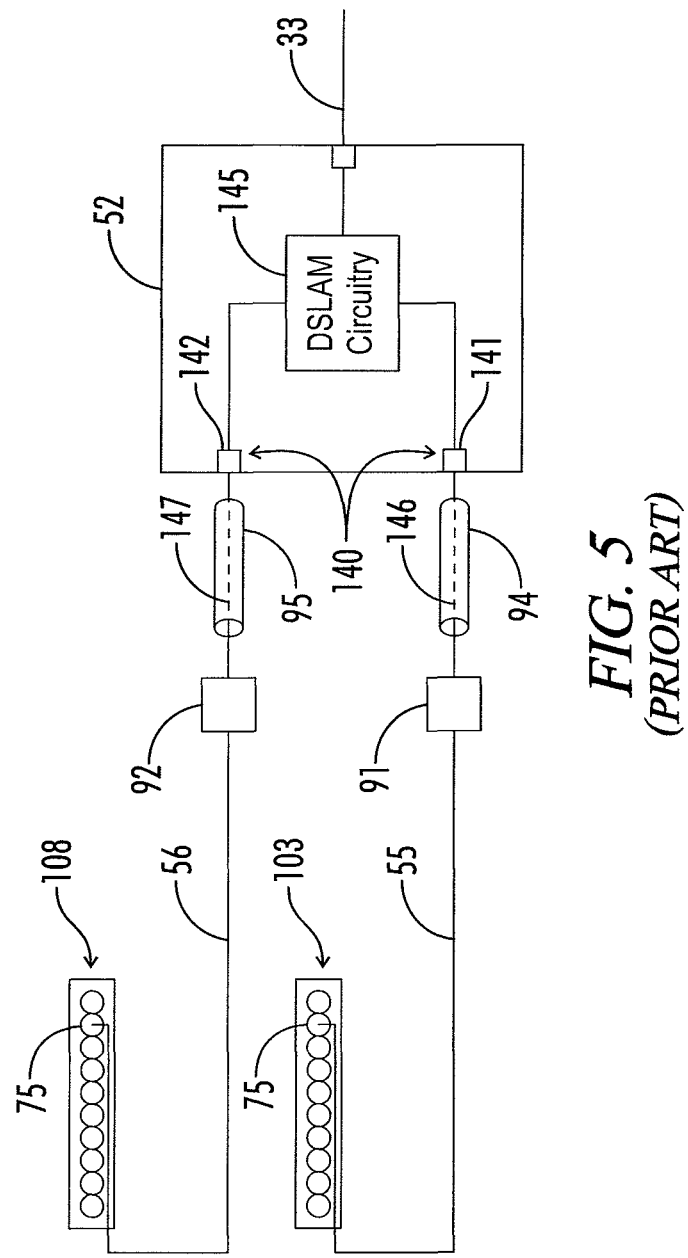
FIG. 5 is a block diagram illustrating a conventional DSLAM coupled to terminals of the cross-connect apparatus depicted by FIG. 4.

Referring to FIG. 5, the penultimate terminal 75 of row 103 is electrically connected to a POTS side 141 of a DSLAM port 140 via a POTS pair 55, connector 91, and a pair 146 of cable 94, and the penultimate terminal 75 of row 108 is electrically connected to a DSL side 142 of the DSLAM port 140 via a DSL pair 56, connector 92, and a respective pair of the cable 95. Downstream POTS signals from a feeder pair 31 connected to the penultimate terminal 75 of row 103 pass through DSLAM circuitry 145 to the DSL side 142 of the port 140. The circuitry 145 also receives data from the network facility 29 (FIG. 1) via the network data line 33 and transmits DSL signals defining such data to the DSL side 142 of the port 140, combining it with the POTS signal via frequency band splitter or filter (not specifically shown). Both the DSL and POTS signals propagate from the DSL side 142 of the port 140 to the penultimate terminal 75 of row 108. Thus, downstream POTS signals are communicated from a terminal 75 of Terminal Block A, and such POTS signals are received (along with DSL signals injected into the communication path by the DSLAM 52) by a terminal 75 of Terminal Block B at a corresponding location within Terminal Block B.

Referring again to FIG. 4, jumpers for cross-connecting the DSLAM 52 to other feeder pairs 31 and distribution pairs 25 may be similarly connected to Terminal Blocks A and B in order to define the desired paths between the network facility 29 and the customer premises 27. Further, as demand for services increases, DSLAMs may be added to increase the capacity of the cross-connect facility 39. To help keep costs low, a service provider ideally would like to deploy a minimum number of DSLAMs for servicing a given capacity, and add DSLAMs later as demand increases over time. However, such an approach can be problematic when the DSLAMs employ vectoring in an effort to compensate for the effects of crosstalk, as will be further illustrated below.

Figure 6:
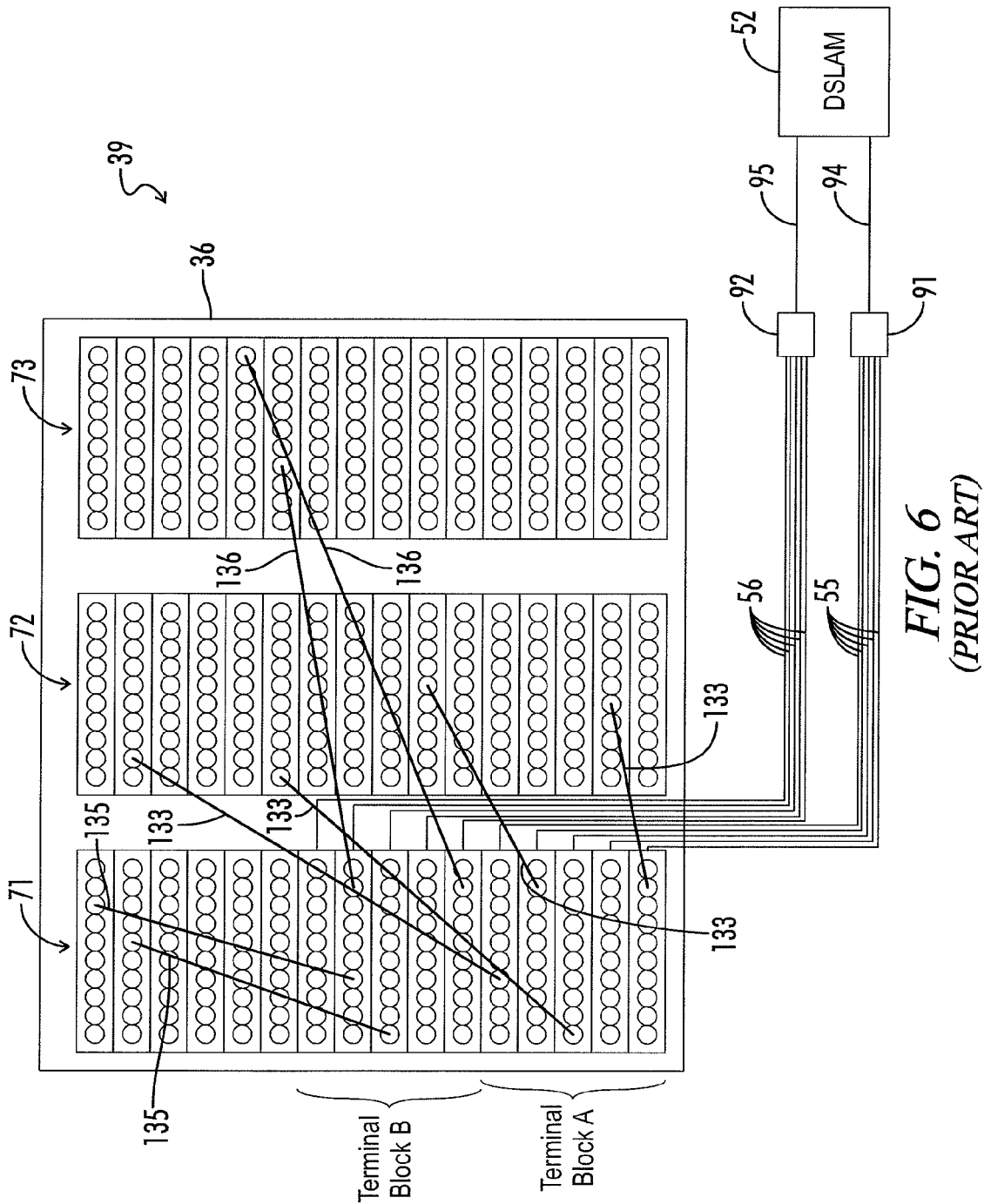
FIG. 6 is a block diagram illustrating a conventional jumper arrangement for the cross-connect apparatus depicted by FIG. 2.

For illustrative purposes, assume that the DSLAM 52 has the capacity to service up to forty-eight distribution pairs 25 extending from the cross-connect facility 39 to customer premises 27. Further, assume that the total number of distribution pairs 25 in both cables 41, 42 initially targeted for DSL services to subscribers is equal to or less than the capacity of the DSLAM (i.e., equal to or less than forty-eight in the current example). In such case, the DSLAM 52 can service all of the existing demand for services, and the use of an additional DSLAM is unnecessary. FIG. 6 shows a conventional arrangement where the DSLAM is servicing distribution pairs 25 in both cables 41, 42. Specifically, some terminals 75 of the Terminal Block B are coupled to distribution pairs 25 of the cable 41 via jumpers 135, and some terminals 75 of the Terminal Block B are coupled to distribution pairs 25 of the cable 42 via jumpers 136 that extend to bay 73.

Generally, the effects of crosstalk are greatest within the same cable. As an example, crosstalk from signals communicated through the distribution cable 41 significantly affects the signals communicated through the same cable 41 but have relatively little effect on signals that do not pass through the cable 41, such as the signals communicated through the distribution cable 42. Thus, in an effort to enhance the benefits of vectoring, it is generally desirable for a given vector group to include all of the distribution pairs 25 in the same cable.

In the embodiment depicted by FIG. 6 where there are less than forty-eight distribution pairs 25 in use for DSL services to customers in both cables 41, 42 and assuming that the DSLAM 52 is capable of performing vectoring among any of its forty-eight ports, the DSLAM 52 can compensate any of the tones communicated through any of the cables 41, 42 for crosstalk induced by any other tone in the same cable 41, 42. Thus, for any tone, the DSLAM 52 is able to compensate for crosstalk induced by the most significant interferers, thereby providing effective crosstalk compensation.

However, as demand for services increases over time, the requested services may exceed the capacity of the DSLAM 52. In such case, an additional DSLAM 152 (FIG. 7) may be deployed and connected to the cross-connect apparatus 36 via techniques similar those described above for the DSLAM 52. In particular, the DSLAM 152 may be connected to a terminal block, referred to hereafter as "Terminal Block C," via POTS pairs 175 that carry POTS signals, and the DSLAM 152 may be connected to a terminal block, referred to hereafter as "Terminal Block D," via DSL pairs 176 that carry both POTS and DSL signals. Notably, the terminals 75 of Terminal Block C are coupled to feeder pairs 31 from the network facility 29 through jumpers 183, and the terminals 75 of Terminal Block D are coupled to distribution pairs 25 of the cable 42 through jumpers 184. Other arrangements for connecting the pairs 175, 176 to the cross-connect apparatus 36 are possible in other embodiments. Note that there is not a one-to-one correspondence between the pairs 175, 176 and the lines that represent them, as described above for the pairs 55, 56. In this regard, each line 175 actually represents multiple POTS pairs 175, and each line 176 actually represents multiple DSL pairs 176.

Figure 7:
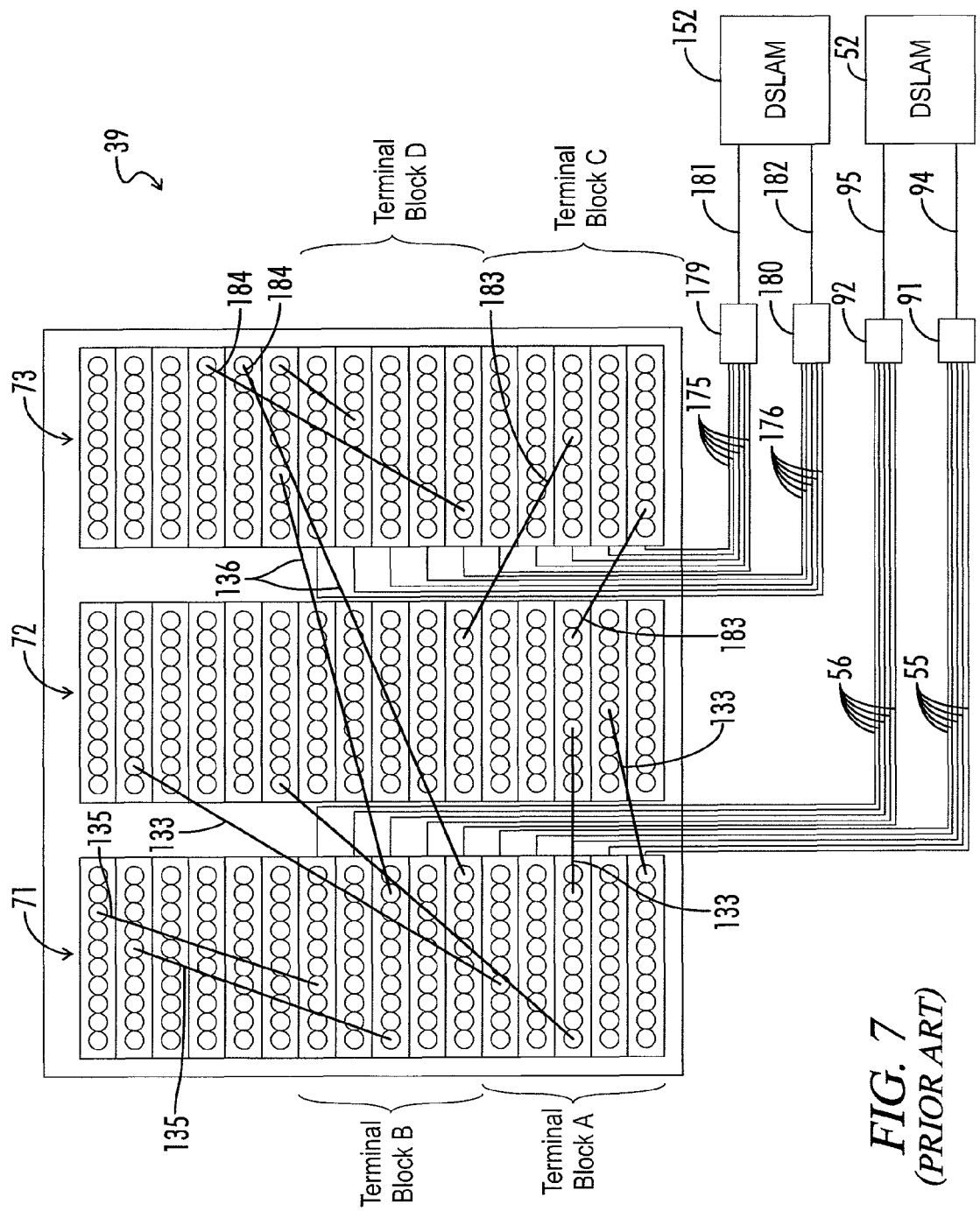
FIG. 7 is a block diagram illustrating a conventional jumper arrangement for the cross-connect apparatus depicted by FIG. 2.

As shown by FIG. 7, connectors 179, 180 are used to connect the pairs 175, 176 to the DSLAM 152. In this regard, DSLAM cables 181, 182 extend from the DSLAM 152, and each DSLAM cable 181, 182 comprises a plurality of conductive connections (e.g., twisted-wire pairs). The connectors 179, 180 respectively connect the DSLAM cables 181, 182 to the pairs 175, 176 in a manner similar to how the connectors 91, 92 connect the DSLAM cables 94, 95 to the pairs 55, 56 of FIG. 6.

Note that the DSLAM 152 may be added without re-arranging the original jumpers 133, 135, 136, as can be seen by comparing FIG. 7 and FIG. 6. In such case, either DSLAM 52, 152 may service distribution pairs 25 in both distribution cables 41, 42. Thus, to ensure that any signal communicated through either cable 41, 42 can be compensated for crosstalk induced by any signal in the same cable 41, 42, the size of the vector group needs to increase from forty-eight ports to ninety-six ports. That is, each DSLAM 52, 152 needs the capability of performing vectoring between any of the ports in either of the DSLAMS 52, 152. To enable such vectoring, vectoring information may be passed between the DSLAMs 52, 152, using a method such as described by U.S. patent application Ser. No. 13/016,680. Such a solution substantially increases the complexity of the vectoring operations.

Figure 8:
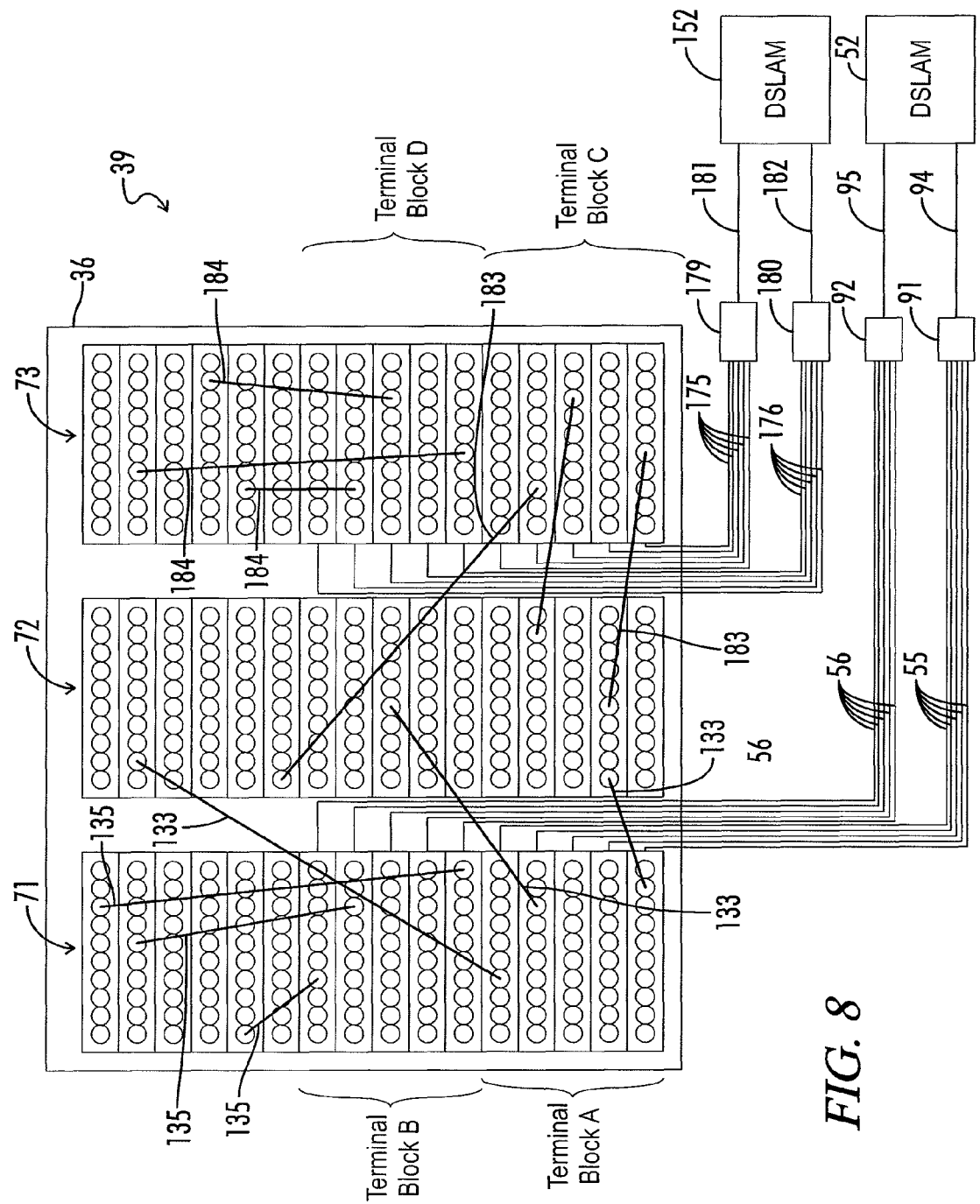
FIG. 8 is a block diagram illustrating an exemplary jumper arrangement for a cross-connect apparatus, such as is depicted by FIG. 1.

To keep the complexity of vectoring operations low, the original jumper configuration shown in FIG. 6 can be updated when the new DSLAM 152 is added, as shown by FIG. 8, such that each distribution pair 25 in the same cable 41, 42 is coupled to the same respective DSLAM 52, 152. For example, in FIG. 8, each distribution pair 25 of the cable 41 is coupled through the wiring bay 71 to the DSLAM 52, and each distribution pair 25 of the cable 42 is coupled through the wiring bay 73 to the DSLAM 152. In such case, to ensure that any tone communicated through either cable 41, 42 can be compensated for crosstalk induced by any other tone in the same cable 41, 42, the size of the vector group does not need to increase beyond forty-eight ports. That is, each DSLAM 52, 152 needs the capability of performing vectoring only between its own ports. Thus, the vector group size can be limited to forty-eight ports so that the complexity of vectoring operations is not increased as DSLAMs are added. However, such an approach has the significant drawback of likely requiring a reconfiguration of the jumpers each time a DSLAM is added to increase capacity. Not only is such reconfiguration burdensome, but it is also prone to errors and, hence, a lengthy disruption of service.

If both DSLAMs 52, 152 are initially deployed such that distribution pairs 25 of a given cable 41, 42 are not coupled to both DSLAMs 52, 152, then reconfiguration of the jumpers becomes unnecessary when a new DSLAM is added. For example, if both DSLAMs 52, 152 are available at the beginning of deployment, then the distribution pairs 25 of cable 41 can be coupled only to the DSLAM 52, and the distribution pairs 25 of the cable 42 can be coupled only to the DSLAM 152, according to the arrangement shown by FIG. 8, without having to configure the jumpers as shown by FIG. 6. However, this approach has the significant disadvantage of requiring both DSLAMs 52, 152 at the beginning of deployment when the demand for services may only require one such DSLAM. Thus, the possibility of deploying a single DSLAM 52 at the beginning of deployment and then adding a DSLAM 152 when warranted by demand is lost.

Figure 4:
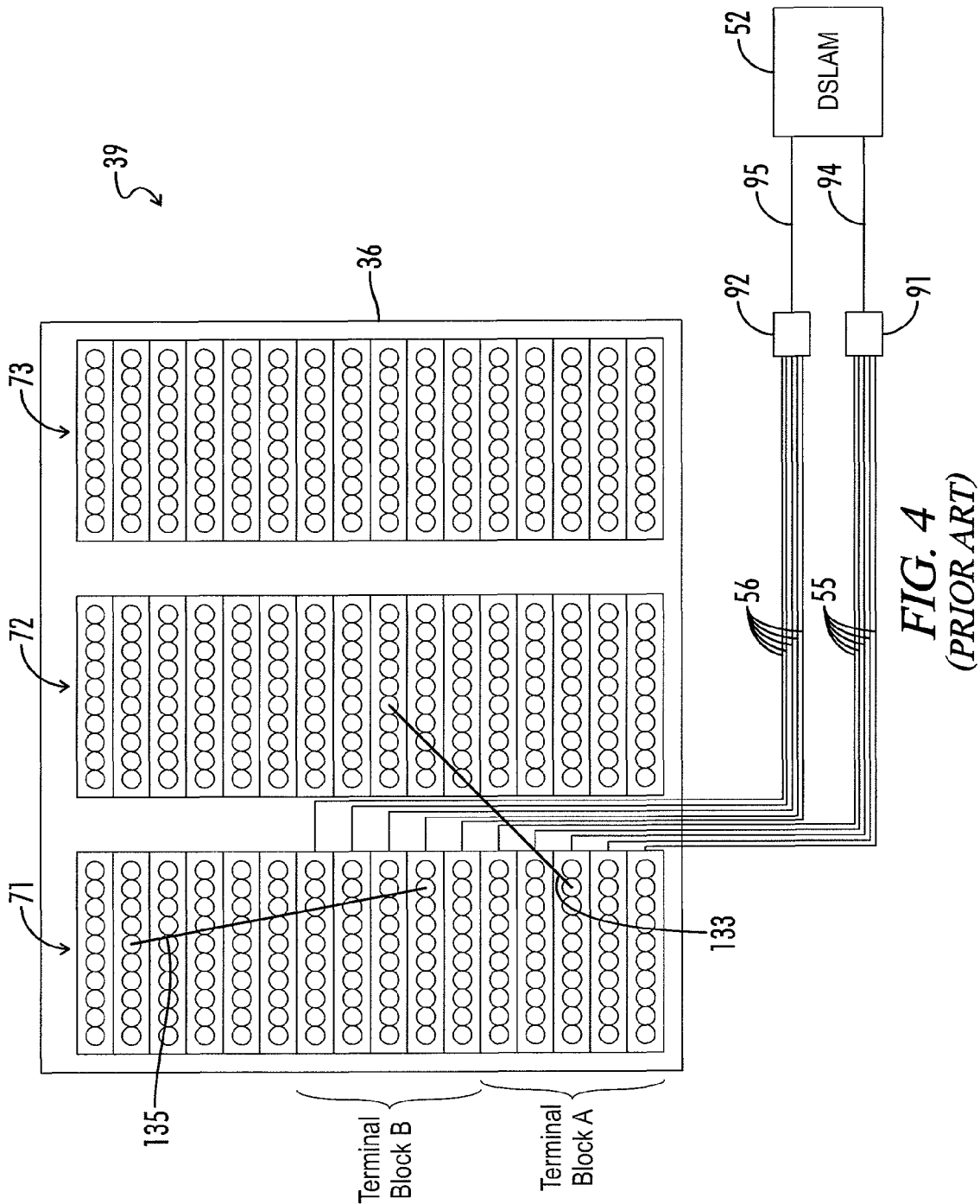
FIG. 4 is a block diagram illustrating a conventional jumper arrangement for the cross-connect apparatus depicted by FIG. 2.
Figure 9:
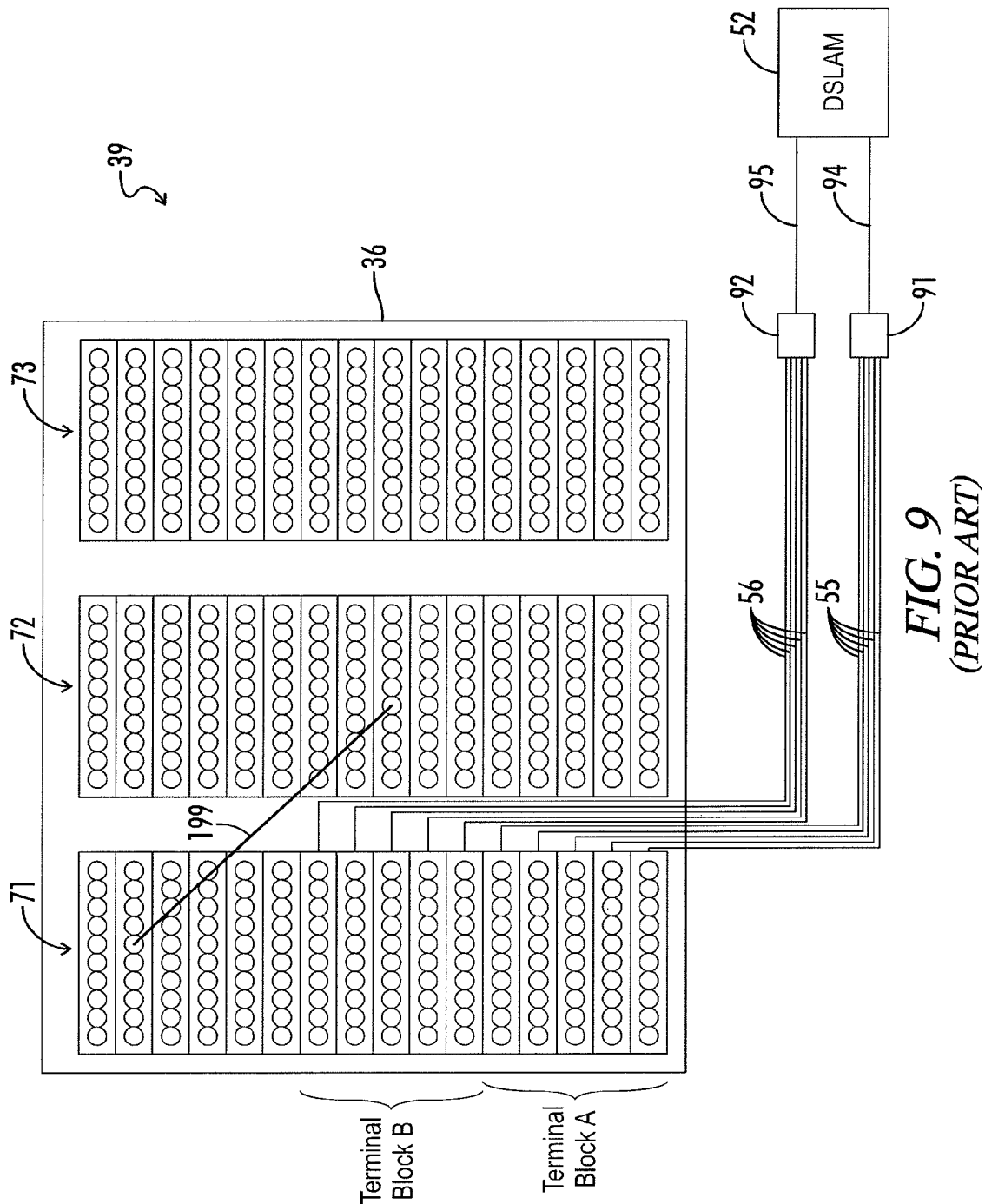
FIG. 9 is a block diagram illustrating the cross-connect apparatus depicted by FIG. 4 after jumpers have been reconfigured to accommodate moving a DSL launch point downstream.

Note that there may be other contexts in which the jumpers of the cross-connect may need reconfiguration. For example, for a given distribution cable 41, 42, it may be desirable to move the DSL launch point downstream. That is, it may be desirable to add a DSLAM downstream from the cross-connect facility 39 for inserting data into the distribution cable 41, 42 at a point closer to the customer premises 27. In such case, the jumpers of the cross-connect apparatus 36 may be reconfigured in order to allow the POTS signals carried by the distribution cable to bypass the DSLAM 52 at the cross-connect facility 36. As an example, assume that the DSL launch point for the distribution pair electrically connected to the jumpers 133, 135 shown by FIG. 4 is to be moved downstream. In such case, the jumpers 133, 135 may be replaced by a new jumper 199, which jumps from one of the terminals 75 previously connected to an end of the replaced jumper 133 to another terminal 75 previously connected to an end of the replaced jumper 135, as shown by FIG. 9. Such reconfiguration is generally undesirable for at least the reasons indicated above.

In one exemplary embodiment of the present disclosure, an approach is provided that allows a minimum number of DSLAMs to be initially deployed with a low vector group size and without requiring the vector group size to increase or the original jumper configuration to be changed as demand for services grows. In this regard, the size of the vector group is preferably limited to the maximum number of DSL services forecast to be deployed in the largest distribution cable. That is, the vector group size is limited to the maximum number of distribution pairs 25 with DSL service expected to be deployed to customers through any one of the distribution cables 41, 42 interfaced with the cross-connect apparatus 36, though other vector group sizes can be used in other embodiments. By limiting the vector group size to the maximum forecast deployed distribution pair count, it can be ensured that any signal communicated through a given distribution cable 41, 42 can be compensated for crosstalk induced by any other signal in the same cable, as will be described in more detail hereafter. As demand for services increases and DSLAMs are added, the distribution pairs 25 bound by a given cable 41, 42 are moved in bulk from an existing DSLAM to a new DSLAM so that each distribution pair 25 bound by the same cable 41, 42 is serviced by the same DSLAM without requiring jumper reconfiguration at the cross-connect apparatus 36.

Specifically, a plurality of distribution pairs 25 bound within the same cable 41, 42, are connected through the cross-connect apparatus 36 to a multi-pair connector, which will be described in more detail below. At initial deployment, the multi-pair connector is connected to a DSLAM, thereby electrically connecting each of the distribution pairs to such DSLAM. When a new DSLAM is later added, the multi-pair connector is disconnected from the existing DSLAM and connected to the new DSLAM, thereby moving each of the distribution pairs 25 in bulk and thus simultaneously to the new DSLAM. If there are other distribution pairs 25 of the same cable not connected to the multi-pair connector, these other distribution pairs 25 may be similarly moved in bulk to the new DSLAM via one or more other multi-pair connectors. Thus, it is possible for a substantial group (up to and including all pairs) of the distribution pairs 25 of the same cable 25 to be quickly moved to the new DSLAM without requiring jumper reconfiguration.

Figure 10:
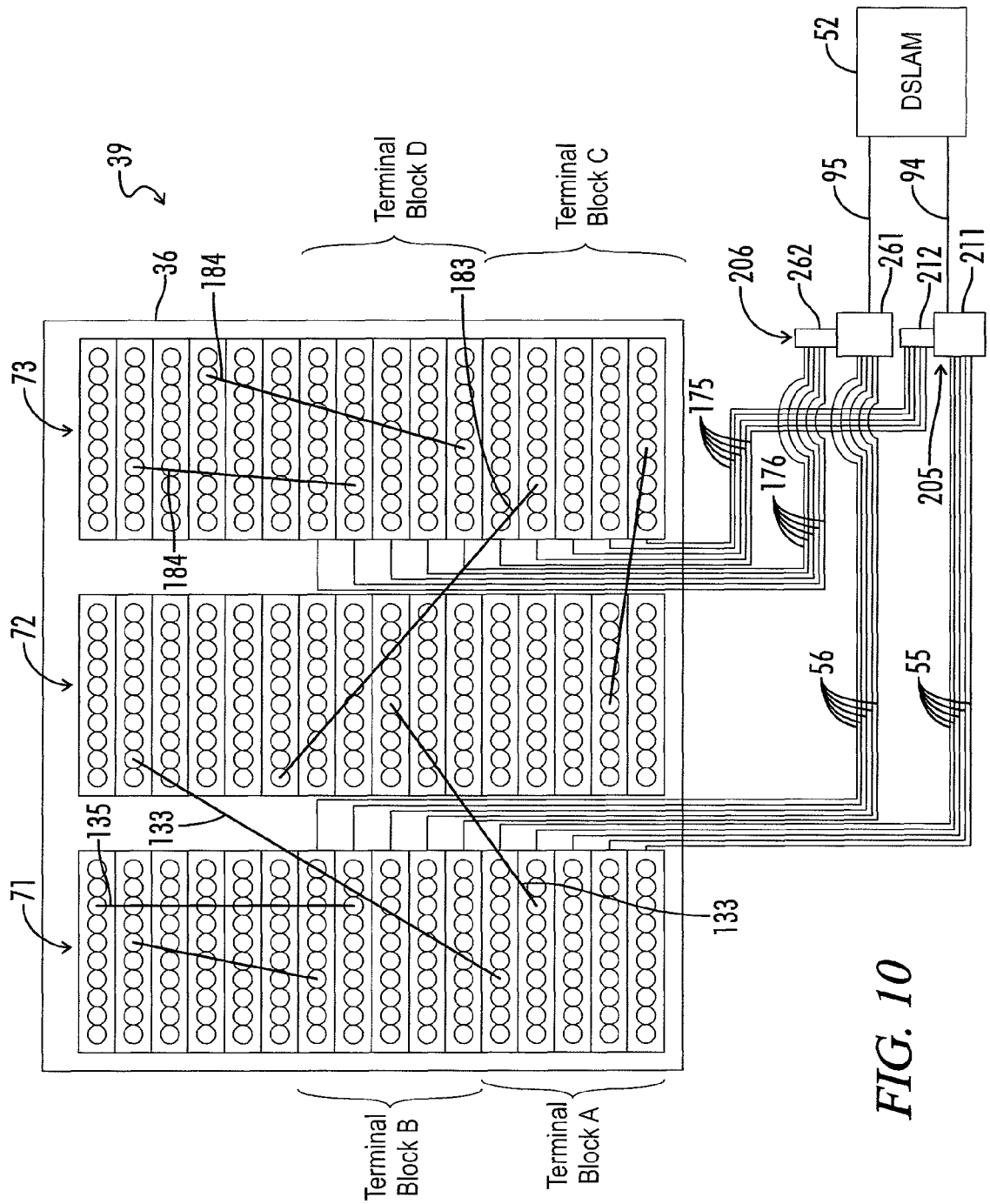
FIG. 10 is a block diagram illustrating an exemplary jumper arrangement for a cross-connect apparatus, such as is depicted by FIG. 2.

FIG. 10 depicts an exemplary arrangement for the cross-connect apparatus 36 and DSLAM 52. In the embodiment depicted by FIG. 10, each port of the DSLAM 52 is coupled to a POTS pair 55 and a DSL pair 56. Specifically, a POTS side of a given port is electrically connected to a POTS pair 55 though a bridge connection assembly 205, and the DSL side of the same port is electrically connected to DSL pair 56 through a bridge connection assembly 206. Such a bridge connection assembly can be constructed via common splicing system modules, such as those that are part of the 3M 710 Splicing System and the 3M MS² Splicing System. (For simplicity and clarity, the 710 Splicing System components will be described hereafter for exemplary purposes, though other devices with similar functionality can be used as well.) The bridge connection assembly 205 has a connector 211, referred to herein as "straight connector," that is removably connected to another connector 212, referred to herein as a "bridge connector." In one exemplary embodiment, the straight connector 211 is implemented via a conventional splicing system connector module, commonly referred to as a "710 straight connector," and the bridge connector 212 is implemented via a conventional splicing system connector module, commonly referred to as a "710 bridge connector." In other embodiments, other types of connectors may be used. As a mere example, MS² connectors may be used in other embodiments. Notably, each connector 211, 212 is a multi-pair connector in that it is used to connect a first plurality of pairs to a second plurality of pairs.

As an example, the straight connector 211 is connected to ends of a plurality of the POTS pairs 55 and to an end of the DSLAM cable 94 and provides an electrical interface between such POTS pairs 55 and DSLAM cable 94. Thus, the connector 211 interfaces a plurality of POTS pairs 55 with a plurality of pairs bound by the cable 94. Similarly, the connector 212 interfaces a plurality of POTS pairs 55 with the pairs bound by the cable 94. As will be described in more detail below, each terminal 75 of Terminal Block A is conductively coupled to a respective port of the DSLAM 52 through the straight connector 211.

Figure 11:
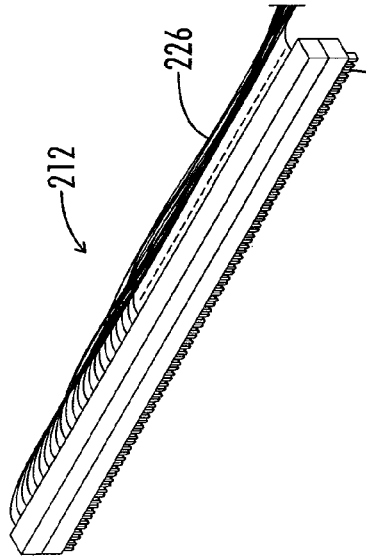
FIG. 11 depicts an exemplary embodiment of a straight connector, such as is depicted by FIG. 10.

FIG. 11 shows an exemplary embodiment of the straight connector 211 when it is implemented via a conventional 710 straight connector. As shown by FIG. 11, the straight connector 211 has a row of insulation-displacement connectors (IDCs) 222 along a side of the connector 211. Each IDC 222 has a respective slot 223 for receiving an insulated wire (not shown by FIG. 11) of the DSLAM cable 94 (FIG. 10). Within such slot 223 of an IDC 222, there is a metallic blade (hidden from view in FIG. 11) that slices the insulation of the wire inserted into the slot 223, thereby making an electrical connection with the conductive portion of the wire. When properly made, the connector blade cold-welds to the conductive portion of the wire resulting in a highly reliable connection with the wire. Thus, by inserting each wire of the DSLAM cable 94 into the slot 223 of a respective IDC 222, electrical connectivity is established between such wire and a respective wire 224 of a POTS pair 55.

Figure 12:
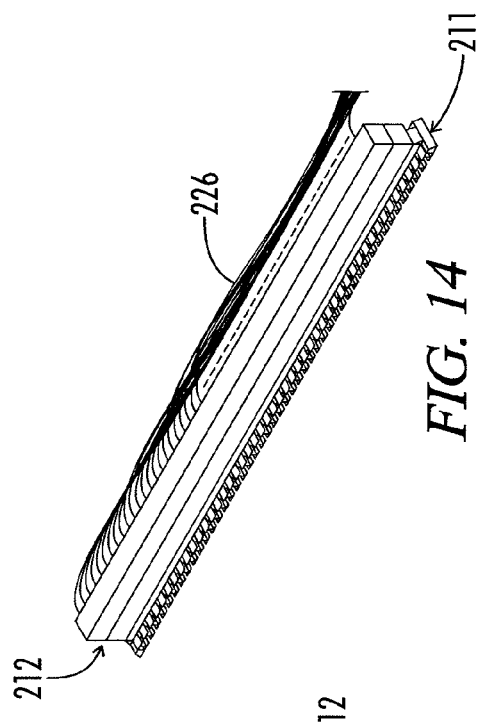
FIG. 12 depicts an exemplary embodiment of a bridge connector, such as is depicted by FIG. 10.
Figure 13:
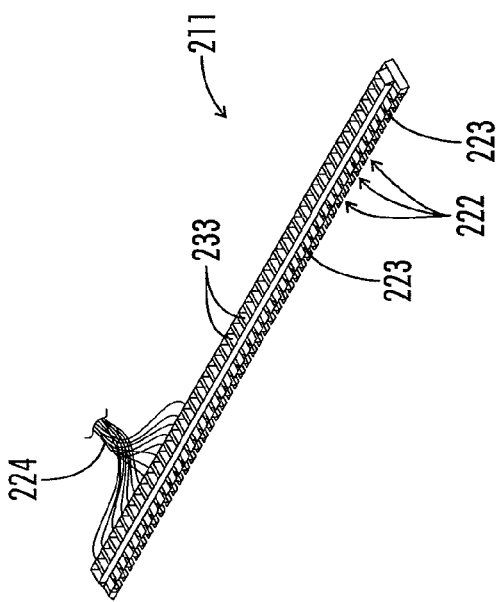
FIG. 13 depicts the straight connector of FIG. 11 and the bridge connector of FIG. 12 as the connectors are being mated.
Figure 14:
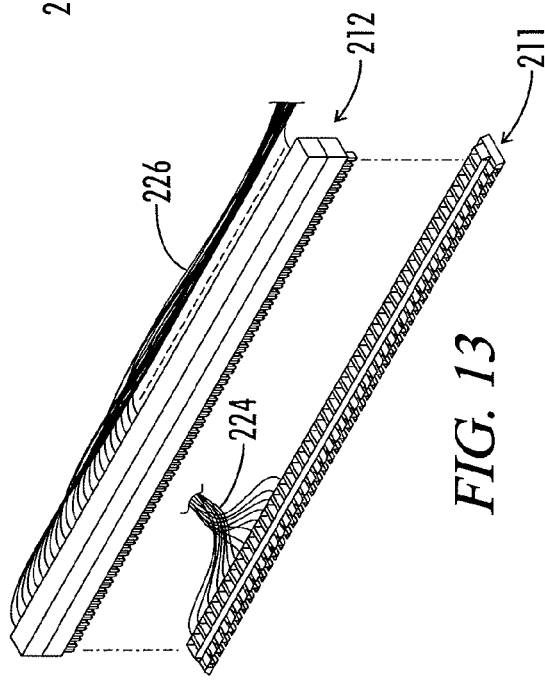
FIG. 14 depicts the straight connector of FIG. 11 mated with the bridge connector of FIG. 12.

FIG. 12 depicts an exemplary embodiment of the bridge connector 212 when it is implemented as a conventional 710 bridge connector. As shown by FIG. 12, the bridge connector 212 has a plurality of metallic inserts 236 that are respectively coupled to the wires 226 of POTS pairs 175 that extend to the terminals 75 of Terminal Block C. Referring again to FIG. 11, the straight connector 211 has a row of receptacles 233 for receiving the metallic inserts 236 of the bridge connector 212. When the bridge connector 212 is mated with the straight connector 211, each insert 236 is inserted into a respective receptacle 233 and makes an electrical connection with a respective wire (not shown) of the DSLAM cable 94. Thus, for each wire of the DSLAM cable 94, the connection assembly 205 forms a "Y" connection in which electrical connectivity is made with a wire 224 of a POTS pair 55 and a wire 226 of a POTS pair 175. Accordingly, the POTS side of a port of the DSLAM 52 that is conductively coupled to a respective terminal 75 of Terminal Block A through the connection assembly 205 is also conductively coupled to a respective terminal 75 of Terminal Block C through the same connection assembly 205. That is, the connection assembly 205 shorts such terminals 75. Note that FIGS. 13 and 14 show a progression as the bridge connector 212 is being connected to the straight connector 211 with FIG. 14 showing the bridge connector 212 fully connected to the straight connector 211.

While the same port of the DSLAM 52 is electrically connected to two terminals 75 in the instant embodiment, care should taken to ensure that only one feeder pair 31 is electrically connected to either terminal 75 in order to prevent interference that would otherwise result due to multiple POTS signals from multiple feeder pairs 31 simultaneously propagating across the same POTS pair 55. There are various techniques that may be used in order to achieve the foregoing.

As an example, a network service provider might allocate only a portion (e.g., half) of the terminals 75 of Terminal Block A for servicing feeder pairs 31. The other terminals 75 of Terminal Block A, referred to hereafter as "unused terminals," remain unconnected to any feeder pair 31, except for the connections provided through the bridge connection assembly 205. In such case, the network service provider also allocates only a portion of the terminals 75 of Terminal Block C for servicing feeder pairs 31. In particular, the terminals 75 of Terminal Block C that are electrically connected to the unused terminals of Terminal Block A through the bridge connection assembly 205 are so allocated. The other terminals 75 of Terminal Block C remain unconnected to feeder pairs 31, except for the connections provided through the bridge connection assembly 205. As a mere example, to facilitate determination of which terminals 75 are allocated for servicing feeder pairs 31, the network service provider might allocate the left half of Terminal Block A for servicing feeder pairs 31 and the right half of Terminal Block C for servicing feeder pairs 31.

In another example, a network service provider might allocate terminals for Terminal Block A starting with the first terminal 75 of Terminal Block A and then allocating terminals consecutively such that the next allocated terminal 75 is contiguous with the last allocated terminal 75 in the same terminal row. Once an entire terminal row is allocated, the next contiguous row is then allocated. For terminal Block C, the network service provider may similarly allocate terminals except that he or she begins with the last terminal 75 of Terminal block C and begins allocating in the reverse direction relative to Terminal Block A. In other embodiments, yet other techniques are possible for ensuring that, for each Y-connection of the bridge connection assembly 205 electrically connecting a terminal 75 of Terminal Block A to a terminal 75 of Terminal Block C, only one feeder pair 31 is electrically connected to either such terminal 75.

In one exemplary embodiment, the bridge connection assembly 206 is configured identically to the bridge connection assembly 205. Thus, the bridge connection assembly 206 has a straight connector 261 mated with a bridge connector 262, which is coupled to terminals 75 of Terminal Block D via DSL pairs 176. Like the bridge connection assembly 205 described above, the bridge connection assembly 206 forms a "Y" connection for each wire (not specifically shown) of the DSLAM cable 95. Thus, a DSL side of a given port of the DSLAM 52 is electrically connected to a respective terminal 75 of Terminal Block B and is also electrically connected to a respective terminal 75 of Terminal Block D. As described above for the bridge connection assembly 205, steps are preferably taken to ensure that, for each Y-connection of the bridge connection assembly 206 electrically connecting a terminal 75 of Terminal Block B to a terminal 75 of Terminal Block D, only one distribution pair 25 is electrically connected to either such terminal 75. Techniques similar to those described above for the feeder pairs 31 and bridge connection assembly 205 may be used to achieve the foregoing for the distribution pairs 25 and the bridge connection assembly 206.

In one exemplary embodiment, the cross-connect apparatus 36 is arranged such that the pairs 55, 56 carry signals for only one distribution cable 41 and the pair 175, 176 carry signals for only the other distribution cable 42. As an example, all of the distribution pairs 25 bound by the cable 41 may be electrically coupled to the terminals 75 of Terminal Block B via the backside of the cross-connect apparatus 36 and then also to jumpers 135, which are connected via the front of terminals 75, and all of the feeder pairs 31 that carry signals for CPE 26 serviced by this same cable 41 may be coupled to the terminals 75 of Terminal Block A via the backside of the cross-connect apparatus 36 and then also to jumpers 133. Accordingly, the POTS pairs 55 should carry POTS signals only for the CPE 26 serviced by the cable 41, and the DSL pairs 56 should carry POTS and DSL signals only for the CPE 26 serviced by this same cable 41.

Similarly, all of the distribution pairs 25 bound by the cable 42 may be electrically coupled to the terminals 75 of Terminal Block D via the backside of the cross-connect apparatus 36 and jumpers 184, and all of the feeder pairs 31 that carry signals for CPE 26 serviced by this same cable 42 may be coupled to the terminals 75 of Terminal Block C via the backside of the cross-connect apparatus 36 and jumpers 183. Accordingly, the POTS pairs 175 should carry POTS signals only for the CPE 26 serviced by the cable 42, and the DSL pairs 176 should carry POTS and DSL signals only for the CPE 26 serviced by this same cable 42.

If the maximum forecast deployed DSL distribution pair count of the largest cable route is less than the total number of ports of each the DSLAM at the cross-connect facility 39, then the solution shown by FIG. 10 can be scaled to any number of vectored DSLAMs without having to pass vector information among the DSLAMs in order to compensate for all crosstalk interferers in the same cable, as will be described in more detail hereafter. In this regard, in the instant embodiment, it is assumed that the DSLAM 52 has forty-eight ports such that it can service up to forty-eight distribution pairs 25. Further assume that each of the forty-eight ports of the DSLAM 52 is a member of the same vector group.

For the instant embodiment, the DSLAM 52 may be used to service any number (m) of distribution pairs 25 bound by the cable 41 and any number (n) of distribution pairs 25 bound by the cable 42 provided that m+n is less than the vector group size limit (i.e., 48 in the instant example). For such m and n distribution pairs 25, the DSLAM 52 performs vectoring to compensate for crosstalk that couples from line-to-line in the same cable 41, 42.

Figure 15:
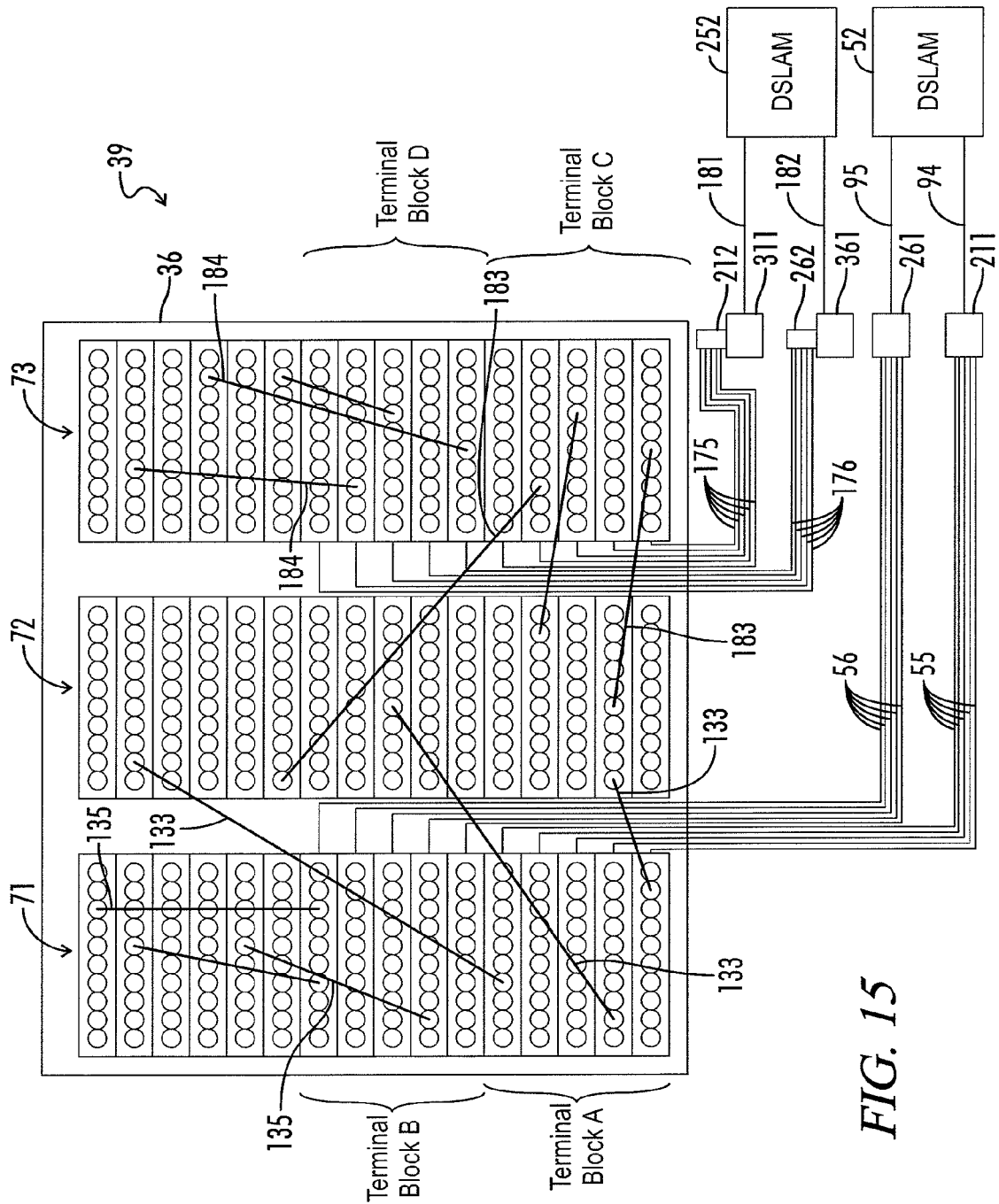
FIG. 15 is a block diagram illustrating the cross-connect apparatus of FIG. 10 after a vectored DSLAM has been added.

Once demand for services exceeds the capacity of the DSLAM 52 (e.g., when the desired total number of m+n distribution pairs 25 deployed to customers exceeds forty-eight in the instant example), the solution shown by FIG. 10 may be migrated to the solution shown by FIG. 15. In this regard, FIG. 15 shows the cross-connect facility 39 after another vectored DSLAM 252 has been added in order to accommodate increased demand for services. For illustrative purposes, assume that the vectored DSLAM 252 is configured identically to the vectored DSLAM 52 such that it has forty-eight ports for servicing up to forty-eight distribution pairs 25. Further, like the DSLAM 52, the DSLAM 252 is configured to perform vectoring in order to compensate any victim tone transmitted or received by it for crosstalk induced by any interfering tone transmitted or received by it. That is, each of the forty-eight ports of the DSLAM 252 is a member of the same vector group.

In addition, like the DSLAM 52, the added DSLAM 252 has a DSLAM cable 181 comprising connections (e.g., twisted-wire pairs) that are coupled to the POTS side of its ports at one end and to a straight connector 311 at the other. The DSLAM 252 also has a DSLAM cable 182 comprising connections (e.g., twisted-wire pairs) that are coupled to the DSL side of its ports at one end and to a straight connector 361 at the other. Once the DSLAM 252 is added, a technician preferably disconnects the bridge connector 212 from the straight connector 211 for DSLAM 52 and mates such bridge connector 212 with the straight connector 311 for the new DSLAM 252. The technician also disconnects the bridge connector 262 from the straight connector 261 for DSLAM 52 and mates such bridge connector 262 with the straight connector 361 of the new DSLAM 252. Thus, the DSLAM 252 is now electrically coupled to the Terminal Blocks C and D similar to how the DSLAM 52 is electrically coupled to the Terminal Blocks A and B. Accordingly, the distribution pairs 25 of the cable 42 are electrically coupled to and serviced by the DSLAM 252 while the distribution pairs 25 of the cable 41 are electrically coupled to and serviced by the DSLAM 52. To enable service, the provisioning of the services that are moved from ports in DSLAM 52 to ports in DSLAM 252 will be transferred to the new DSLAM 252.

In particular, in the downstream direction, POTS signals destined for the CPE 26 serviced by the cable 41 are received by the terminals 75 of the Terminal Block A from the feeder pairs 31 and jumpers 133, and these POTS signals propagate across the POTS pairs 55 to the DSLAM 52. Such POTS signals, as well as DSL signals carrying data destined for the CPE 26 serviced by the cable 41 and received from the network data line 33, are transmitted across the DSL pairs 56 to the Terminal Block B and across the jumpers 135 to the distribution pairs 25 of the cable 41. In the upstream direction, transmissions from the CPE 26 serviced by the cable 41 travel the same path in the opposite direction.

In addition, POTS signals destined for the CPE 26 serviced by the cable 42 are received by the terminals 75 of the Terminal Block C from the feeder pairs 31 and jumpers 183, and these POTS signals propagate across the POTS pairs 175 to the DSLAM 252. Such POTS signals, as well as DSL signals carrying data destined for the CPE 26 serviced by the cable 42 and received from the network data line 33, are transmitted across the DSL pairs 176 to the Terminal Block D and ultimately across the distribution pairs 25 of the cable 42. In the upstream direction, transmissions from the CPE 26 serviced by the cable 42 travel the same path in the opposite direction.

By intelligently arranging the cross-connect apparatus 36 and DSLAM 52, as shown by FIG. 10 at initial deployment, such that the signals for distribution pairs 25 bound by the same cable 41, 42 respectively propagate across the same set of pairs 55, 56, or 175, 176, as described above, it is possible to easily migrate to an increased number of vectored DSLAMs by moving the pairs 175, 176 in bulk to the new DSLAM 252 without having to rearrange the jumpers of the cross-connect apparatus 36.

Notably, the vector group size can be kept small helping to reduce complexity in the vectoring operations while still achieving effective crosstalk reduction. In this regard, even after the migration when the total number of distribution pairs (m+n) exceeds the vector group size, the distribution pairs 25 of a given cable 41, 42 are serviced by the same DSLAM. As long as the vector group size is large enough to accommodate the maximum number of deployed distribution pairs in a given cable 41, 42, then it can be ensured that vectoring can be used to reduce crosstalk for all of the lines 25 bound by the same cable.

It should be noted that the techniques described herein may be used with any number of cables, distribution pairs, terminal blocks, and DSLAMs, as well as with any vector group size and DSLAM size. Further, any number of connectors (e.g., bridge connectors or straight connectors) may be used for a given cable 41, 42. For example, if the number of distribution pairs 25 bound by a cable 41, 42 exceeds the capacity of a bridge connector, then multiple bridge connectors for the same cable may be used. The techniques described herein allow for a bulk move of any number of distribution pairs from one connection assembly to another for any reason. For example, with $MS^2$ connectors, connector strips may be stacked to accommodate a greater number of distribution pairs 25.

Figure 16:
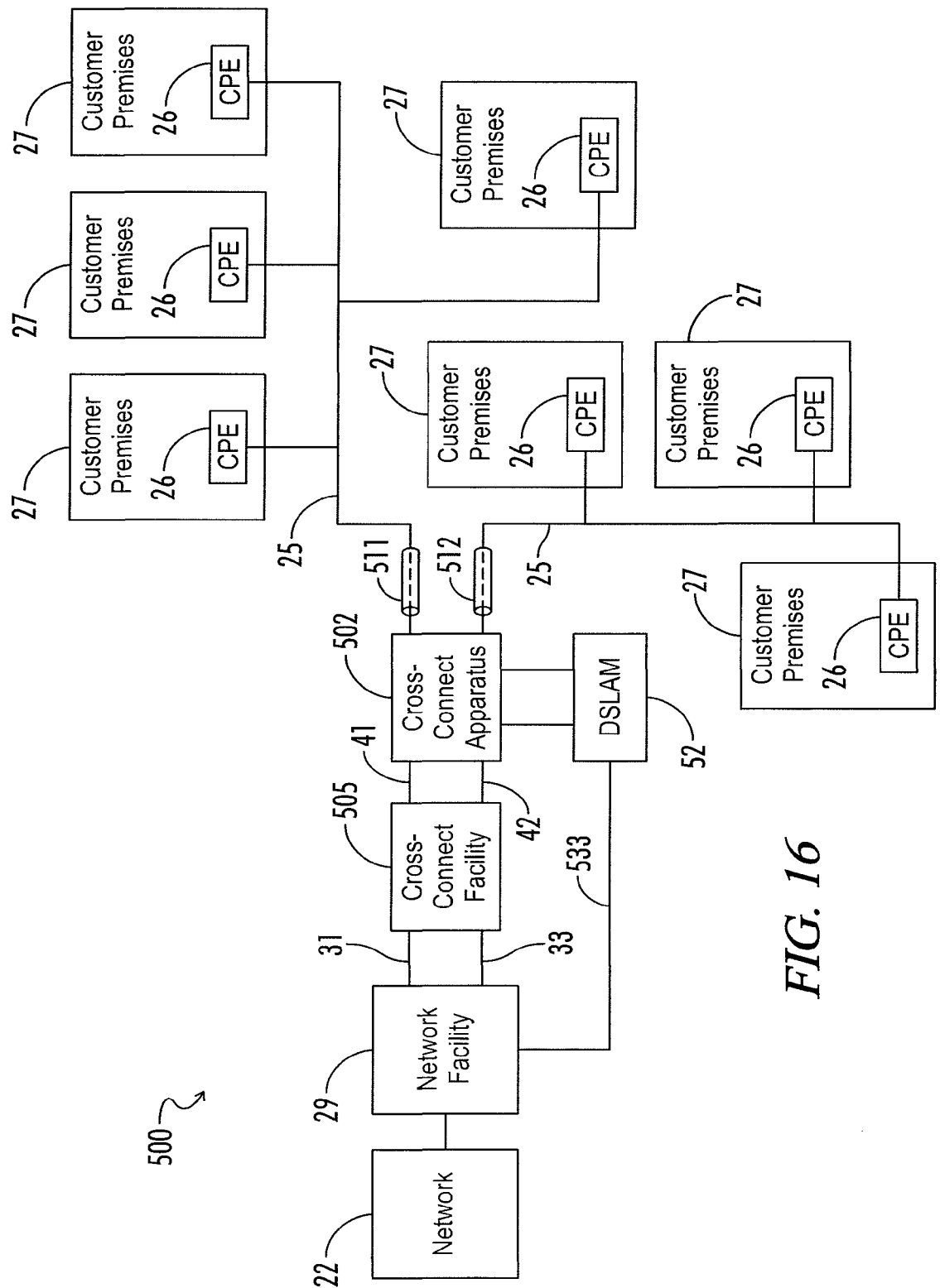
FIG. 16 is a block diagram illustrating an exemplary embodiment of a communication system.

It should be further noted that the techniques for migrating to an increased number of DSLAMs may be employed at any point between the network facility 29 and the customer premises 27. As an example, FIG. 16 shows an exemplary embodiment of a communication system 500 in which a cross-connect apparatus 502 is inserted downstream from a cross-connect facility 505. The cross-connect facility 505 may be similar to the cross-connect facility 39 of FIG. 10 except that the cross-connect facility 505 does not inject DSL data into the cables 41, 42. (The cross-connect facility 505 may inject DSL data into other cables not shown in FIG. 16.) However, the POTS signals from the feeder pairs 31 pass through the cross-connect facility 505 as described above for the facility 39. Thus, the cables 41, 42 carry only POTS signals in the instant embodiment.

Figure 17:
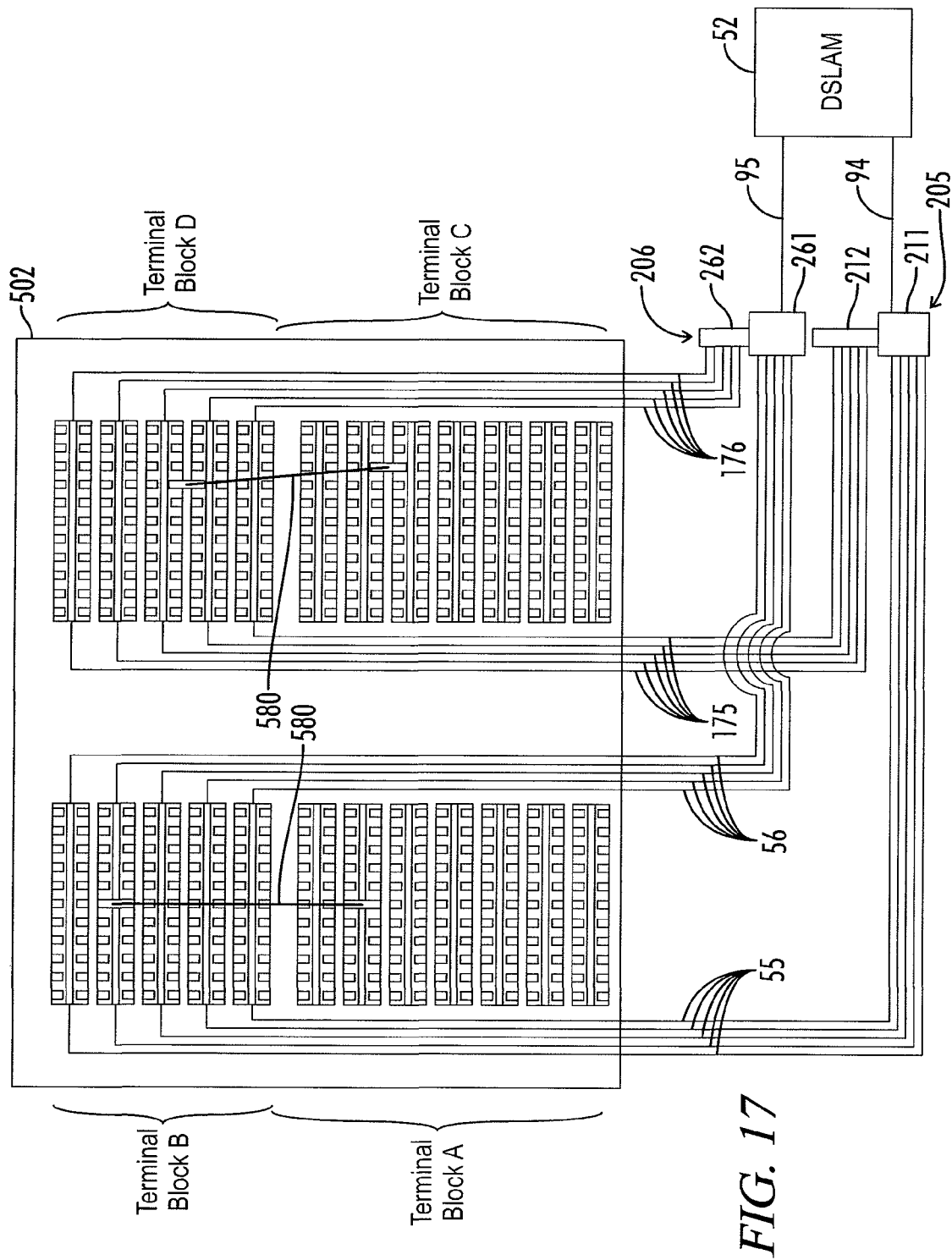
FIG. 17 is a block diagram illustrating a conventional cross-connect apparatus, such as is depicted by FIG. 16.

The cross-connect apparatus 502 is coupled to a DSLAM 52 that injects DSL signals, as described above for the embodiment depicted by FIG. 10. In this regard, FIG. 17 depicts an exemplary embodiment of the cross-connect apparatus 502. In the embodiment depicted by FIG. 17, the cross-connect apparatus 502 is of a conventional type, commonly referred to as a "distribution interceptor" (which can be constructed our of ADC Krone LS2 terminal blocks.) In FIG. 17, the apparatus 502 is shown as having a respective bay 571, 573 of terminals 75 for each cable 41, 42 "intercepted" by the apparatus 502. Other numbers of bays are possible in other embodiments.

In FIG. 17, the terminals 75 of Terminal Block A are respectively coupled to the distribution pairs 25 of cable 41. Each such terminal 75 is also coupled to a respective distribution pair 25 of a cable 511 (FIG. 16) through which distribution pairs 25 extend toward customer premises 27. In the absence of a jumper 580 inserted into a given terminal 75, the terminal 75 electrically connects the two distribution pairs 25 that are coupled to it. That is, a terminal 75 electrically connects a distribution pair 25 of cable 41 to a distribution pair 25 of cable 511. Thus, a downstream POTS signal carried by the distribution pair 25 of the cable 41 bypasses the DSLAM 52 and propagates across the distribution pair 25 of the cable 511. Further, an upstream POTS signal carried by the distribution pair 25 of the cable 511 bypasses the DSLAM 52 and propagates across the distribution pair 25 of the cable 41. Accordingly, if a particular distribution pair 25 of the cable 511 is not to carry DSL signals, a jumper 580 does not need to be inserted into the terminal 75 of Terminal Block A to which the distribution pair 25 is coupled.

However, for any distribution pair 25 of the cable 511 that is to carry DSL signals, a jumper 580 is preferably inserted into the terminal 75 of Terminal Block A to which the distribution pair 25 is coupled. The apparatus 502 is configured such that insertion of a jumper 580 into a terminal 75 of Terminal Block A effectively breaks the direct electrical connection between the distribution pairs 25 of cables 41, 511 coupled to such terminal 75. In such case, the signals carried by such distribution pairs 25 are sent to the DSLAM. Note that each jumper comprises two connection pairs in which each pair is used for carrying signals in a respective direction to or from the DSLAM 52, as will be described in more detail below.

In this regard, when a jumper 580 is inserted into a given terminal 75 of Terminal Block A, such insertion breaks the direct electrical connection that otherwise exists between the two distribution pairs 25 of cables 41, 511 coupled to such terminal 75, as described above. Thus, a downstream POTS signal carried by a distribution pair 25 of cable 41 coupled to such terminal 75 propagates across such jumper 580 to the terminal 75 of Terminal Block B into which the jumper 580 is inserted. From such terminal 75, the signal propagates across a respective POTS pair 55 to the DSLAM 52. The DSLAM 52 forms a DSL signal based on data received from a network data line 533 (e.g., an optical fiber) (FIG. 16) and transmits the POTS signal and DSL signal across a DSL pair 56 to the foregoing terminal 75 of Terminal Block B into which the jumper 580 is inserted. The POTS and DSL signals then propagate across the jumper 580 to the terminal 75 of Terminal Block A that originally received the POTS signal from the distribution pair 25 of cable 41, such terminal 75 of Terminal Block A electrically connects the jumper 580 to a distribution pair 25 of cable 511. Thus, the POTS and DSL signals propagate across such distribution pair 25 of cable 511 to the CPE 27 that is connected to this distribution pair 25.

In the upstream direction, signals follow the same path in reverse. In particular, a POTS and DSL signals carried by a distribution pair 25 of the cable 511 pass through a terminal 75 of Terminal Block A, a jumper 580, a terminal 75 of Terminal Block B, and a respective DSL pair 56 to the DSLAM 52. The DSLAM 52 demodulates the DSL signal to recover data to be transmitted to the network facility 29 via the network data line 533 (FIG. 16). Further, the DSLAM 52 passes the POTS signal through a respective POTS pair 55, the foregoing terminal 75 of Terminal Block B, the jumper 580, and the terminal 75 of Terminal Block A that originally received the POTS signal from the distribution pair 25 of the cable 511. The POTS signals pass through such terminal 75 to the distribution pair 25 of cable 41 that is coupled to this terminal 75.

In addition, the bay 573 is configured to interface signals between the cables 42, 512 in a manner similar to that described above for the bay 571 in interfacing signals between the cables 41, 511.

Figure 18:
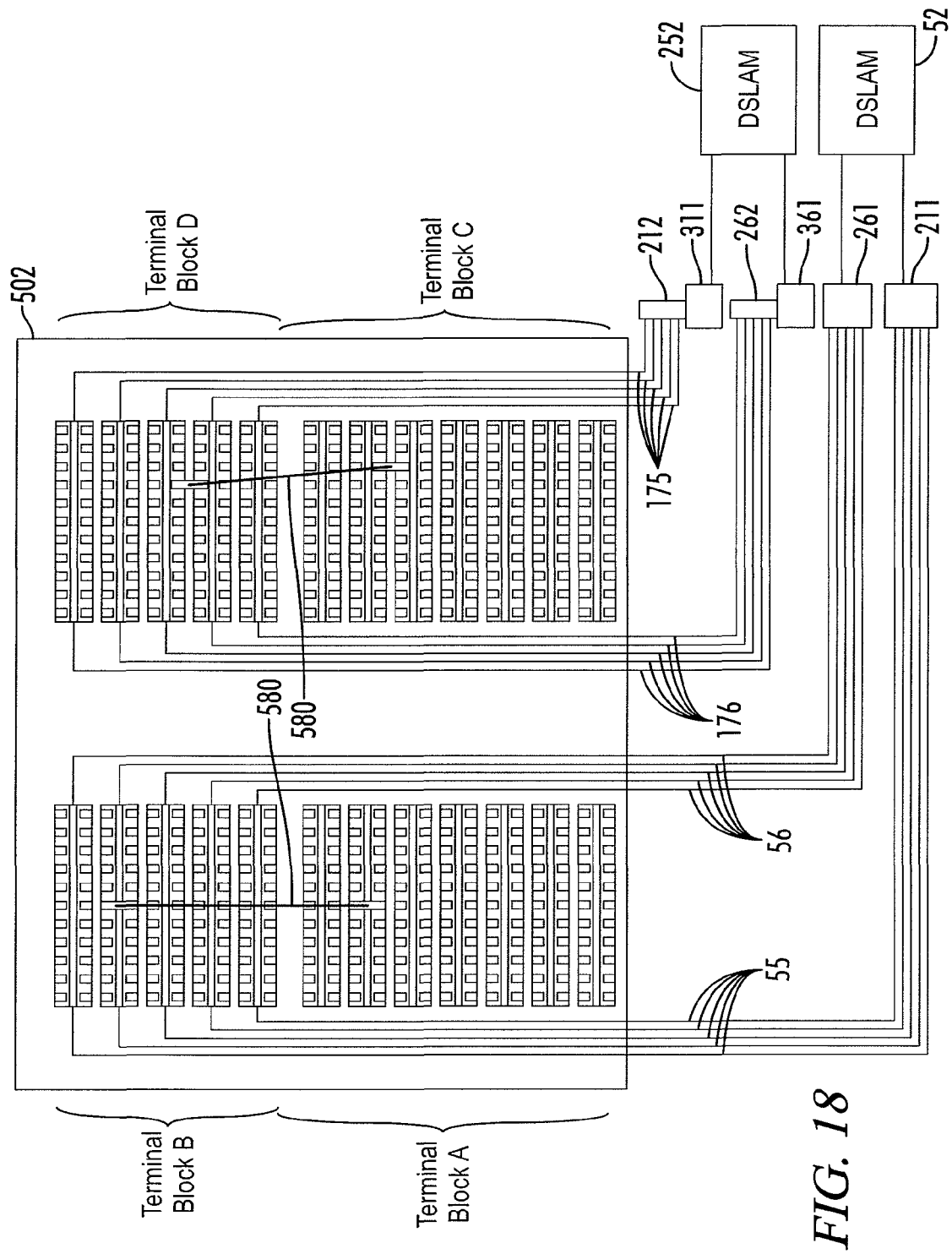
FIG. 18 is a block diagram illustrating the cross-connect apparatus of FIG. 17 after a vectored DSLAM has been added.

When a new DSLAM 252 is added, the distribution pairs 25 of cables 42, 512 may be moved in bulk from the existing DSLAM 52 to the new DSLAM 252 by disconnecting the bridge connectors 212, 262 from the straight connectors 211, 261, respectively, and mating the bridge connectors 212, 262 with the straight connectors 311, 361, respectively, as shown by FIG. 18 and as described above for the embodiments shown by FIGS. 10 and 15. Note that such DSLAM addition is accommodated without having to reconfigure the jumpers 580, and since the distribution pairs 25 of the same cable 511, 512 are not simultaneously serviced by both DSLAMs 52, 252, there is no need for vectoring to span across both DSLAM 52, 252. Thus, the size of the vector group can be kept small, thereby achieving the benefits described above for the embodiment shown by FIGS. 10 and 15.

In the embodiments described above, the distribution pairs 25 are essentially partitioned into various groups so that groups of distribution pairs 25 may be moved in bulk to a new DSLAM 252 by disconnecting the bridge connector for one group of distribution pairs 25 from one DSLAM and connecting such bridge connector to another DSLAM. It should be noted that there may be other reasons for partitioning distribution pairs 25 into groups. One such reason may be for moving a DSL launch point from one location to another. In such example, the distribution pairs 25 for which the DSL launch point is to be moved in the future may be partitioned into a group that are coupled to a bridge connector. When the DSL launch point is to be moved, then such bridge connector may be cross-connected with another bridge connector coupled to the feeder pairs 31 at the facility 39 so that POTS passes through the facility 39, and a DSLAM installed downstream toward the customer premises 27 may be installed and used.

To better illustrate the foregoing, assume that the distribution pairs 25 (FIG. 1) of the cable 42 are coupled to CPE 26 at customer premises 27 located a greater distance from the cross-connect facility 39 than the CPE 26 serviced by the cable 41. At some point, the network service provider may plan to move the DSL launch point from the network facility 39 to a point closer to the customer premises serviced by the cable 42, such as for example when more subscribers activate service through the cable 42, thereby shortening the lengths of the DSL paths.

Figure 19:
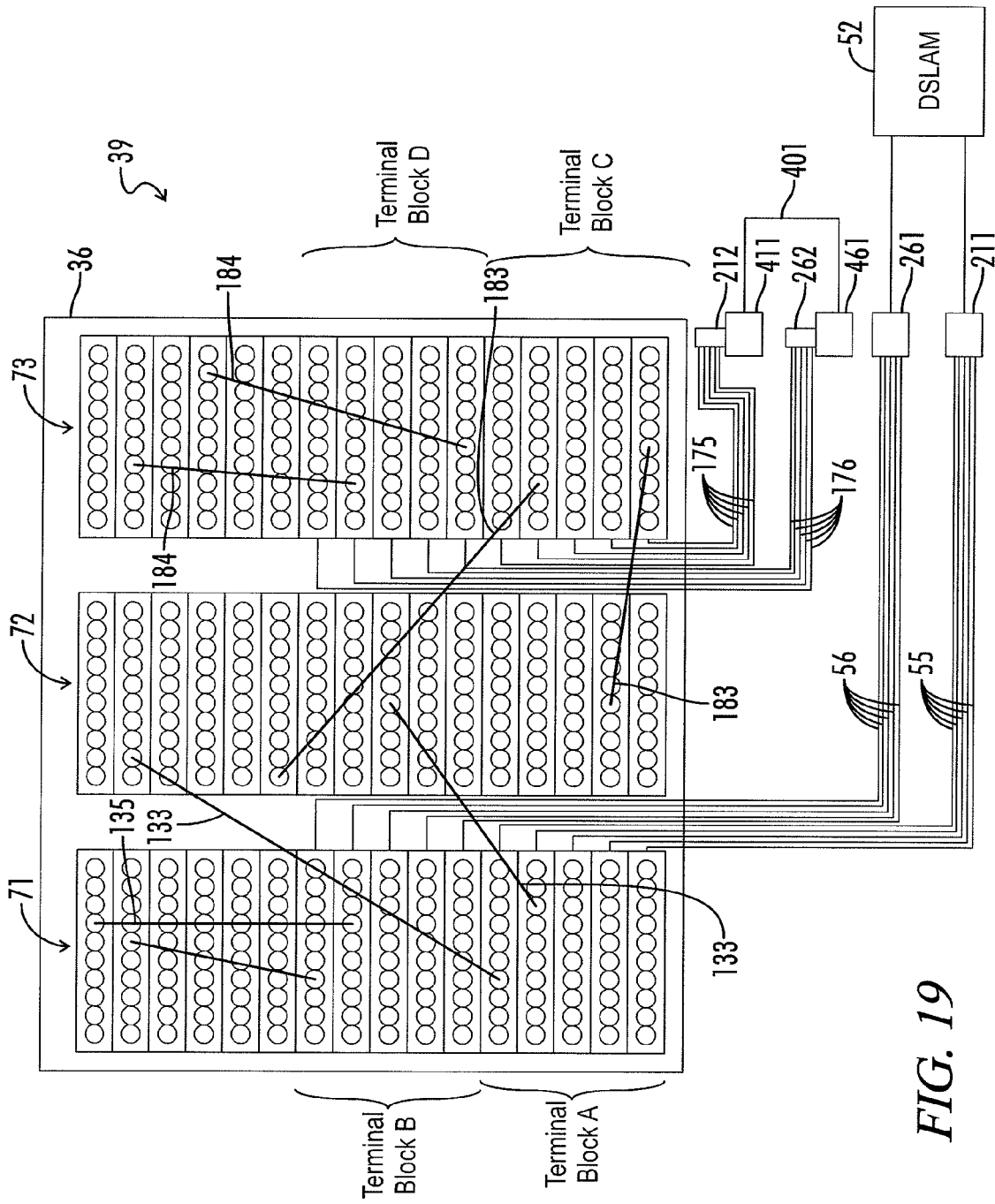
FIG. 19 is a block diagram illustrating the cross-connect apparatus of FIG. 10 after a DSL launch point has been moved downstream.

Initially, the network facility 39 may be arranged according to FIG. 10 in which the distribution pairs 25 of the cable 42 are electrically coupled to the bridge connector 262 through the DSL pairs 176 and in which the feeder pairs 31 carrying the POTS signals for the cable 42 are electrically coupled to the bridge connector 212 through the POTS pairs 175. When the DSL launch point is to be moved, the bridge connectors 212, 262 are disconnected from the straight connectors 211, 261, respectively, and connected to a jumper 401 having multiple pairs (preferably twisted) and a pair of straight connectors 411, 461 at each end, as shown by FIG. 19. Thus, each terminal 75 of Terminal Block C is electrically coupled to a respective terminal 75 of Terminal Block D through the pairs 175, 176 and jumper 401. Accordingly, POTS signals pass through the cross-connect apparatus 36.

Figure 20:
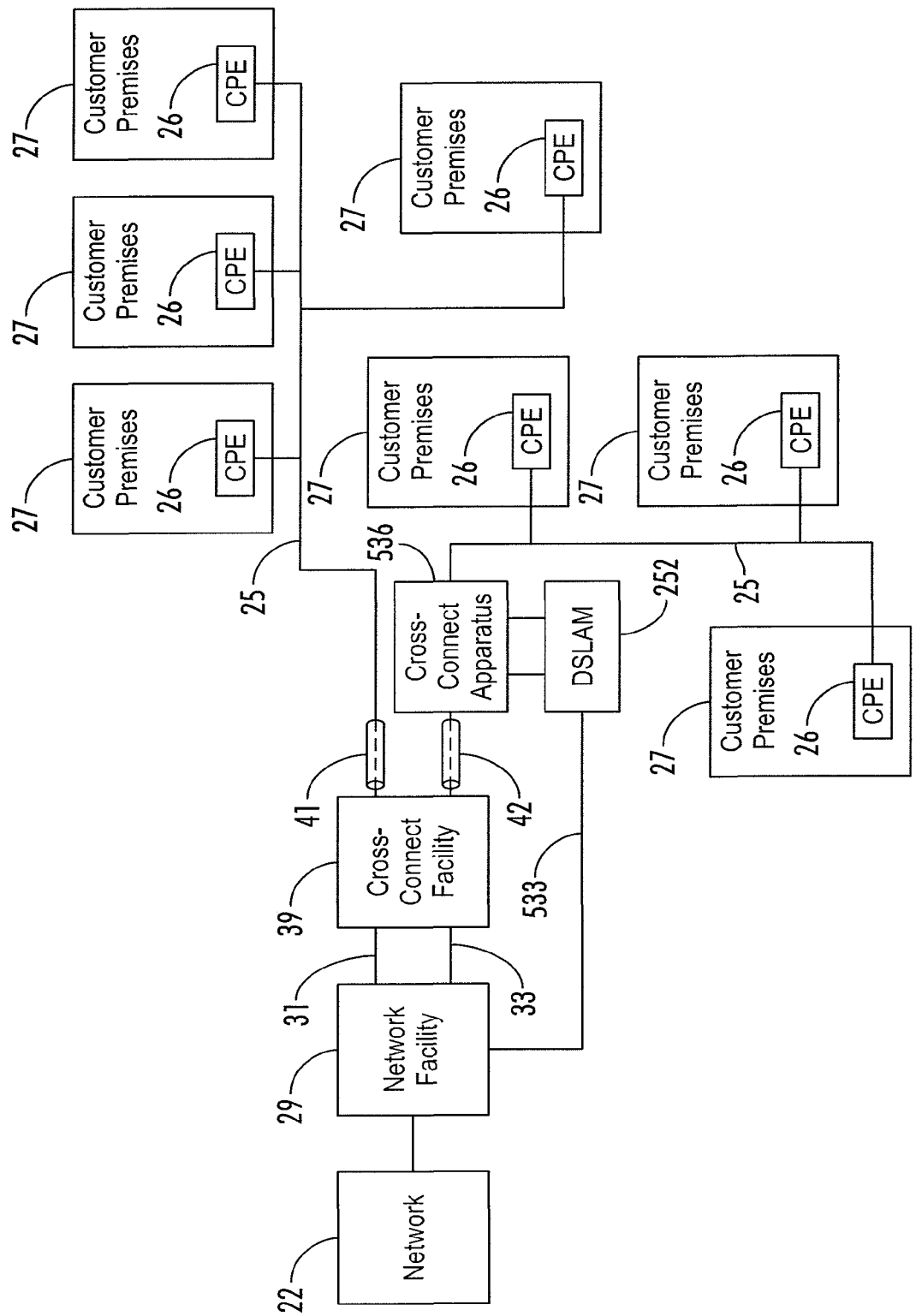
FIG. 20 is a block diagram illustrating a communication system, such as is depicted by FIG. 1, after a DSL launch point has been moved downstream from a cross-connect facility.

In this regard, in moving the DSL launch point, a new DSLAM 252 may be installed downstream closer to the CPE 26 serviced by the cable 42, as shown by FIG. 20. Rather than having DSL signals injected into the distribution pairs 25 at the cross-connect facility 39, the downstream DSLAM 252 may inject the DSL signals, such that the signals propagating between the cross connect facility 39 and a downstream cross-connect apparatus 536 are POTS. In such case, the POTS signals simply pass through the cross-connect facility 39 unchanged. Distribution pairs extending from the cross-connect apparatus 536 to customer premises 27 carry both POTS and DSL. Although the example shows all of the pairs for a given cable having the DSL launch point moved, this can be done for a subset of the pairs as desired by employing the techniques described herein.

Now, therefore, the following is claimed:

1. A method for moving a digital subscriber line (DSL) launch point, comprising:
   electrically connecting a plurality of feeder pairs bound by a first cable to a first digital subscriber line access multiplexer (DSLAM) through a first cross-connect apparatus and a first multi-pair connector;
   electrically connecting a first plurality of distribution pairs bound by a second cable to the first DSLAM through the first cross-connect apparatus and a second multi-pair connector;
   communicating POTS signals from the feeder pairs bound by the first cable through the first DSLAM to the first plurality of distribution pairs bound by the second cable;
   receiving first digital data at the first DSLAM;
   transmitting digital subscriber line (DSL) signals based on the first digital data from the first DSLAM through the first plurality of distribution pairs bound by the second cable;
   disconnecting the first and second multi-pair connectors from the first DSLAM;
   electrically connecting the first and second multi-pair connectors such that POTS signals propagate from the feeder pairs bound by the first cable to the first plurality of distribution pairs bound by the second cable without passing through the first DSLAM;
   electrically connecting the first plurality of distribution pairs bound by the second cable to a second DSLAM through a second cross-connect apparatus downstream from the first cross-connect apparatus;
   electrically connecting a second plurality of distribution pairs bound by a third cable to the second DSLAM through the second cross-connect apparatus;
   communicating POTS signals from the feeder pairs bound by the first cable through the first plurality of distribution pairs bound by the second cable, the second cross-connect apparatus, and the second DSLAM to the second plurality of distribution pairs bound by the third cable;
   receiving second digital data at the second DSLAM; and
   transmitting DSL signals based on the second digital data from the second DSLAM through the second plurality of distribution pairs bound by the third cable.

2. The method of claim 1, wherein the DSL signals transmitted from the first DSLAM comprise very-high-speed digital subscriber line, second generation (VDSL2) signals, and wherein the DSL signals transmitted from the second DSLAM comprise VDSL2 signals.

3. The method of claim 1, further comprising:
electrically connecting a third plurality of distribution pairs bound by a fourth cable to the first DSLAM through the first cross-connect apparatus and a third multi-pair connector; and
connecting the first and third multi-pair connectors prior to the disconnecting.

4. The method of claim 3, wherein the disconnecting comprises separating the first multi-pair connector from the third multi-pair connector.

5. A method, comprising:
electrically connecting a first plurality of terminals of a cross-connect apparatus to a first multi-pair connector;
electrically connecting the first plurality of terminals to a first plurality of conductors bound by a first cable;
electrically connecting the first multi-pair connector to a first digital subscriber line access multiplexer (DSLAM) such that each of the first plurality of terminals is electrically connected to a respective port of the first DSLAM;
electrically connecting a second plurality of terminals of the cross-connect apparatus to a second multi-pair connector;
electrically connecting the second plurality of terminals to a second plurality of conductors bound by a second cable;
electrically connecting the second multi-pair connector to the first DSLAM such that each of the second plurality of terminals is electrically connected to a respective port of the first DSLAM;
communicating plain old telephone system (POTS) signals via the first plurality of terminals and the DSLAM;
communicating the POTS signals and digital subscriber line (DSL) signals via the second plurality of terminals and the first DSLAM; and
bypassing the first DSLAM with POTS signals from the first plurality of conductors, the
bypassing comprising disconnecting the first and second multi-pair connectors from the first DSLAM and electrically connecting the first multi-pair connector to the second multi-pair connector.

6. The method of claim 5, wherein each of the first plurality of conductors comprises feeder pairs, and wherein each of the second plurality of conductors comprises distribution pairs.

7. The method of claim 5, wherein the DSL signals comprise very-high-speed digital subscriber line, second generation (VDSL2) signals.

8. The method of claim 5, further comprising:
electrically connecting the second plurality of conductors bound by the second cable to a second DSLAM;
electrically connecting a third plurality of conductors bound by a third cable to the second DSLAM;
communicating POTS signals through the first plurality of conductors bound by the first cable, the second plurality of conductors bound by the second cable, the first plurality of terminals, the second DSLAM, and the second plurality of terminals to the third plurality of conductors bound by the third cable;
receiving digital data at the second DSLAM from a network data line;
forming DSL signals based on the digital data via the second DSLAM; and
transmitting the DSL signals formed by the second DSLAM across the third plurality of conductors bound by the third cable.

9. The method of claim 5, further comprising:
electrically connecting a third plurality of terminals of the cross-connect apparatus to a fourth plurality of conductors bound by a fourth cable;
electrically connecting the third plurality of terminals to a third multi-pair connector; and
connecting the first and third multi-pair connectors prior to the bypassing,
wherein one of the first plurality of terminals is electrically connected to a side of a port of the first DSLAM through the first multi-pair connector, and wherein one of the third plurality of terminals is electrically coupled through the third multi-pair connector to the side of the port to which the one of the first plurality of terminal is simultaneously connected.

10. The method of claim 9, wherein the disconnecting the first and second multi-pair connectors from the first DSLAM comprises separating the first multi-pair connector from the third multi-pair connector.

11. A method, comprising:
electrically connecting a first plurality of conductors bound by a first cable to a first network device through a first cross-connect apparatus having terminals, the first cross-connect apparatus having first jumpers coupled between a portion of the terminals of the cross-connect apparatus for carrying signals between the first network device and the first plurality of conductors;
electrically connecting a second plurality of conductors bound by a second cable to the first network device through the first cross-connect apparatus, the first cross-connect apparatus having second jumpers coupled between a portion of the terminals of the first cross-connect apparatus for carrying signals between the first network device and the second plurality of conductors bound by the second cable; and
disconnecting the first plurality of conductors bound by the first cable and the second plurality of conductors bound by the second cable from the first network device and electrically connecting the second plurality of conductors in bulk to the first plurality of conductors without rearranging the first and second jumpers among the terminals of the first cross-connect apparatus such that signals carried by the first plurality of conductors bound by the first cable pass through the first and second jumpers to the second plurality of conductors bound by the second cable, bypassing the first network device.

12. The method of claim 11, wherein each of the first plurality of conductors comprises feeder pairs, and wherein each of the second plurality of conductors comprises distribution pairs.

13. The method of claim 11, wherein the first network device comprises a digital subscriber line access multiplexer (DSLAM).

14. The method of claim 11, further comprising:
communicating first plain old telephone system (POTS) signals through the first plurality of conductors, the second plurality of conductors, the first jumpers, the second jumpers, and the first network device;
receiving first digital data at the first network device;
forming first digital subscriber line (DSL) signals based on the first digital data; and
transmitting the first DSL signals from the first network device through the second plurality of conductors.

15. The method of claim 14, further comprising:
electrically connecting the second plurality of conductors through a second cross-connect apparatus to a second network device;

electrically connecting a third plurality of conductors bound by a third cable to the second network device through the second cross-connect apparatus;

receiving second digital data at the second network access device;

forming second DSL signals based on the second digital data;

communicating second POTS signals through the first plurality of conductors, the first jumpers, the second jumpers, the second plurality of conductors, the second network device, and the third plurality of conductors; and transmitting the second DSL signals from the second network device through the third plurality of conductors.

16. The method of claim 11, further comprising:

electrically connecting the first plurality of conductors to a first multi-pair connector; and electrically connecting the second plurality of conductors to a second multi-pair connector, wherein the electrically connecting the first plurality of conductors bound by the first cable to the first network device comprises electrically connecting the first multi-pair connector to the first network device, and wherein the electrically connecting the second plurality of conductors bound by the second cable to the first network device comprises electrically connecting the second multi-pair connector to the first network device.

17. The method of claim 11, further comprising:

electrically connecting a third plurality of conductors bound by a third cable through the first cross-connect apparatus to a third multi-pair connector;

electrically connecting the third multi-pair connector to the first network device; and connecting the first multi-pair connector and the third multi-pair connector prior to the disconnecting, wherein the terminals include a first terminal and a second terminal, wherein the first network device has a port having first side and second side, wherein the first and second terminals are electrically connected to the first side of the port simultaneously through the first and third multi-pair connectors.

18. The method of claim 17, wherein the disconnecting comprises separating the first multi-pair connector from the third multi-pair connector.

\* \* \* \* \*